US009443448B2

(12) United States Patent
Hong et al.

(10) Patent No.: US 9,443,448 B2
(45) Date of Patent: Sep. 13, 2016

(54) SHEET HAVING REMOVABLE LABELS

(75) Inventors: Le-Hoa Hong, Monterey Park, CA (US); Martin Utz, Gmund am Tegernsee (DE); Gerardo Veyna, Tijuana (MX); Gildardo Ramirez, Tijuana (MX); Thomas Mammen, La Verne, CA (US)

(73) Assignee: CCL Label, Inc., Framingham, MA (US)

(*) Notice: Subject to any disclaimer, the term of this patent is extended or adjusted under 35 U.S.C. 154(b) by 23 days.

(21) Appl. No.: 12/429,166

(22) Filed: Apr. 23, 2009

(65) Prior Publication Data

US 2010/0129583 A1 May 27, 2010

Related U.S. Application Data

(60) Provisional application No. 61/047,724, filed on Apr. 24, 2008.

(51) Int. Cl.

| | |
|---|---|
| ***G09F 3/00*** | (2006.01) |
| ***B32B 33/00*** | (2006.01) |
| ***B26D 3/00*** | (2006.01) |
| ***G09F 3/10*** | (2006.01) |
| ***G09F 13/08*** | (2006.01) |
| *G09F 3/02* | (2006.01) |

(52) U.S. Cl.

CPC ............... *G09F 3/0288* (2013.01); *G09F 3/10* (2013.01); *G09F 13/08* (2013.01); *G09F 2003/0222* (2013.01); *Y10T 83/04* (2015.04); *Y10T 428/14* (2015.01); *Y10T 428/149* (2015.01); *Y10T 428/1476* (2015.01); *Y10T 428/15* (2015.01)

(58) Field of Classification Search

CPC ........ G09F 3/0288; G09F 3/10; G09F 13/08; G09F 2003/0222; Y10T 428/14; Y10T 428/15; Y10T 428/149; Y10T 428/1476; Y10T 83/04

USPC ...................... 428/40.1, 41.8, 42.1, 42.3, 43

See application file for complete search history.

(56) References Cited

U.S. PATENT DOCUMENTS

| | | | |
|---|---|---|---|
| D2,856 | S | 12/1867 | Stafford |
| 156,959 | A | 11/1874 | Taylor |
| D17,746 | S | 9/1887 | Mellinger |
| D79,566 | S | 10/1929 | Rau |
| D120,517 | S | 3/1940 | Steffen |
| 2,276,297 | A | 3/1942 | Flood |
| 2,303,346 | A | 12/1942 | Flood |
| 2,304,787 | A | 12/1942 | Avery |
| 2,331,019 | A | 10/1943 | Flood |
| 2,372,994 | A | 4/1945 | Welch |
| 2,420,045 | A | 5/1947 | Krug |
| 2,434,545 | A | 1/1948 | Brady, Jr. et al. |
| D168,758 | S | 2/1953 | Odzer |

(Continued)

FOREIGN PATENT DOCUMENTS

| | | |
|---|---|---|
| CN | 1282441 | 1/2001 |
| DE | 2257435 | 6/1973 |

(Continued)

OTHER PUBLICATIONS

Supplemental European Search Report dated Oct. 4, 2007 from European Application No. 03713742.9.

(Continued)

*Primary Examiner* — Patricia L Nordmeyer

(74) *Attorney, Agent, or Firm* — McDonald Hopkins LLC

(57) ABSTRACT

A label sheet including a facestock, and a liner releasably coupled to the facestock. The facestock includes a label and the liner includes a weakened separation line. The weakened separation line at least partially underlies the label. Also, the weakened separation line includes an apex.

20 Claims, 24 Drawing Sheets

(56) References Cited

U.S. PATENT DOCUMENTS

| | | | |
|---|---|---|---|
| 2,679,928 A | 6/1954 | Bishop, Jr. et al. | |
| 2,681,732 A | 6/1954 | Brady | |
| 2,765,205 A | 10/1956 | Capella et al. | |
| 2,883,044 A | 4/1959 | Kendrick | |
| D189,472 S | 12/1960 | Currie et al. | |
| D190,360 S | 5/1961 | Cohen et al. | |
| 3,006,793 A | 10/1961 | Wheeler | |
| 3,038,597 A | 6/1962 | Brady, Jr. | |
| 3,166,186 A | 1/1965 | Karn | |
| 3,230,649 A | 1/1966 | Karn | |
| 3,315,387 A | 4/1967 | Heuser | |
| 3,361,252 A | 1/1968 | Wise | |
| 3,480,198 A | 11/1969 | Repko | |
| 3,568,829 A | 3/1971 | Brady, Jr. | |
| 3,822,492 A | 7/1974 | Crawley | |
| 3,825,463 A | 7/1974 | Amann | |
| 3,859,157 A | 1/1975 | Morgan | |
| 3,896,246 A | 7/1975 | Brady, Jr. | |
| 3,914,483 A | 10/1975 | Stipek, Jr. | |
| 3,965,327 A | 6/1976 | Ehlscheid et al. | |
| 4,032,679 A | 6/1977 | Aoyagi | |
| 4,060,168 A | 11/1977 | Romagnoli | |
| 4,061,808 A | 12/1977 | Sato | |
| 4,217,164 A | 8/1980 | La Mers | |
| 4,264,662 A | 4/1981 | Taylor et al. | |
| 4,356,375 A | 10/1982 | Josephy et al. | |
| 4,364,662 A | 12/1982 | Yuasa et al. | |
| 4,428,857 A | 1/1984 | Taylor et al. | |
| 4,454,180 A | 6/1984 | La Mers | |
| 4,524,095 A | 6/1985 | Gockel et al. | |
| 4,537,809 A | 8/1985 | Ang et al. | |
| 4,619,851 A | 10/1986 | Sasaki et al. | |
| 4,637,635 A | 1/1987 | Levine | |
| 4,648,930 A | 3/1987 | La Mers | |
| 4,704,317 A | 11/1987 | Hickenbotham | |
| 4,706,877 A | 11/1987 | Jenkins | |
| 4,771,891 A | 9/1988 | Sorensen et al. | |
| 4,787,158 A | 11/1988 | Vitol | |
| 4,799,712 A | 1/1989 | Biava et al. | |
| D300,692 S | 4/1989 | le Brocquy | |
| 4,846,504 A | 7/1989 | MacGregor et al. | |
| 4,850,612 A | 7/1989 | Instance | |
| 4,865,204 A | 9/1989 | Vance | |
| 4,881,935 A | 11/1989 | Slobodkin | |
| 4,881,936 A | 11/1989 | Slobodkin | |
| D306,321 S | 2/1990 | Gramera | |
| 4,910,058 A | 3/1990 | Jameson | |
| 4,951,970 A | 8/1990 | Burt | |
| 4,952,433 A | 8/1990 | Tezuka et al. | |
| 4,978,146 A | 12/1990 | Warther et al. | |
| 4,983,438 A | 1/1991 | Jameson | |
| 5,011,559 A | 4/1991 | Felix | |
| 5,031,939 A | 7/1991 | Webendorfer et al. | |
| 5,091,035 A | 2/1992 | Anhauser | |
| 5,129,682 A | 7/1992 | Ashby | |
| 5,182,152 A | 1/1993 | Ericson | |
| 5,230,938 A | 7/1993 | Hess et al. | |
| 5,284,689 A | 2/1994 | Laurash | |
| 5,318,325 A | 6/1994 | Ipsen | |
| 5,324,153 A | 6/1994 | Chess | |
| 5,328,538 A | 7/1994 | Garrison | |
| 5,332,265 A | 7/1994 | Groess et al. | |
| 5,389,414 A | 2/1995 | Popat | |
| 5,407,718 A | 4/1995 | Popat et al. | |
| 5,462,783 A | 10/1995 | Esselmann | |
| 5,484,168 A | 1/1996 | Chigot | |
| 5,487,915 A | 1/1996 | Russ et al. | |
| 5,509,694 A | 4/1996 | Laurash et al. | |
| 5,512,343 A | 4/1996 | Shaw | |
| 5,520,990 A | 5/1996 | Rotermund | |
| 5,536,546 A | 7/1996 | Nash | |
| 5,601,314 A | 2/1997 | Burns et al. | |
| 5,633,071 A | 5/1997 | Murphy | |
| 5,658,631 A | 8/1997 | Bernstein et al. | |
| 5,686,159 A | 11/1997 | Langan | |
| 5,700,535 A | 12/1997 | Galsterer et al. | |
| 5,720,499 A | 2/1998 | Sakashita | |
| 5,756,175 A | 5/1998 | Washburn | |
| 5,782,494 A | 7/1998 | Crandall et al. | |
| 5,788,284 A | 8/1998 | Hirst | |
| 5,789,050 A | 8/1998 | Kang | |
| 5,947,525 A | 9/1999 | Pollman | |
| 5,958,536 A | 9/1999 | Gelsinger et al. | |
| 5,981,013 A | 11/1999 | Russ et al. | |
| 5,993,928 A | 11/1999 | Popat | |
| 5,997,683 A | 12/1999 | Popat | |
| 6,001,209 A | 12/1999 | Popat et al. | |
| 6,004,643 A | 12/1999 | Scheggetman | |
| 6,132,829 A | 10/2000 | Kennerly et al. | |
| 6,136,130 A | 10/2000 | Tataryan et al. | |
| 6,170,879 B1 | 1/2001 | Rawlings | |
| 6,277,229 B1 | 8/2001 | Popat | |
| 6,277,458 B1 * | 8/2001 | Dirksing et al. | 428/42.3 |
| 6,284,708 B1 | 9/2001 | Oshima et al. | |
| 6,361,078 B1 | 3/2002 | Chess | |
| 6,364,364 B1 | 4/2002 | Murphy | |
| 6,391,136 B1 | 5/2002 | Stickelbrocks | |
| 6,403,184 B1 | 6/2002 | Michlin | |
| 6,410,111 B1 | 6/2002 | Roth et al. | |
| 6,413,604 B1 | 7/2002 | Matthews et al. | |
| 6,432,499 B1 | 8/2002 | Roth et al. | |
| 6,479,118 B1 | 11/2002 | Atkinson | |
| D471,933 S | 3/2003 | Hodsdon et al. | |
| 6,579,585 B1 | 6/2003 | Garvic et al. | |
| D482,073 S | 11/2003 | Nakajo et al. | |
| 6,656,555 B1 | 12/2003 | McKillip | |
| 6,803,084 B1 | 10/2004 | Do et al. | |
| 6,837,957 B2 | 1/2005 | Flynn et al. | |
| 6,860,050 B2 | 3/2005 | Flynn et al. | |
| 6,861,116 B2 | 3/2005 | Emmert | |
| 6,905,747 B2 | 6/2005 | Auchter et al. | |
| 6,926,942 B2 | 8/2005 | Garvic et al. | |
| 6,955,843 B2 | 10/2005 | Flynn et al. | |
| 7,246,823 B2 | 7/2007 | Laurash et al. | |
| 7,438,322 B2 | 10/2008 | Miller | |
| 7,625,619 B2 * | 12/2009 | Hodson et al. | 428/40.1 |
| 7,627,972 B2 | 12/2009 | Hodsdon et al. | |
| 7,709,071 B2 | 5/2010 | Wong et al. | |
| 7,963,564 B2 | 6/2011 | Flynn et al. | |
| 7,967,340 B2 | 6/2011 | Hofer et al. | |
| 2002/0086127 A1 | 7/2002 | Hodsdon et al. | |
| 2002/0096874 A1 | 7/2002 | Viby | |
| 2003/0133098 A1 | 7/2003 | Hoshino et al. | |
| 2004/0033326 A1 | 2/2004 | Tataryan et al. | |
| 2004/0050854 A1 | 3/2004 | Presutti et al. | |
| 2004/0078468 A1 | 4/2004 | Hedin et al. | |
| 2004/0101646 A1 | 5/2004 | Hodsdon et al. | |
| 2004/0101648 A1 | 5/2004 | Mulvey et al. | |
| 2004/0213943 A1 | 10/2004 | Viby | |
| 2005/0089663 A1 | 4/2005 | Wong et al. | |
| 2005/0244603 A1 | 11/2005 | Hodsdon et al. | |
| 2006/0049625 A1 | 3/2006 | Miller | |
| 2006/0110565 A1 | 5/2006 | Tataryan et al. | |
| 2006/0147668 A1 | 7/2006 | Hirose et al. | |
| 2006/0154012 A1 | 7/2006 | Ashton et al. | |
| 2006/0210754 A1 | 9/2006 | Presutti et al. | |
| 2007/0114789 A1 | 5/2007 | Morrish | |
| 2008/0054622 A1 | 3/2008 | Hodsdon et al. | |
| 2008/0061548 A1 | 3/2008 | Kuranda et al. | |
| 2008/0163973 A1 | 7/2008 | Euse | |
| 2008/0264556 A1 | 10/2008 | Miller | |
| 2009/0022926 A1 | 1/2009 | Dangami | |
| 2009/0029084 A1 | 1/2009 | Garrison | |
| 2009/0075010 A1 | 3/2009 | Flynn | |
| 2009/0246427 A1 | 10/2009 | Hincks et al. | |
| 2010/0080946 A1 | 4/2010 | Hodsdon et al. | |
| 2010/0116425 A1 | 5/2010 | Konsti et al. | |
| 2010/0233412 A1 | 9/2010 | Wong et al. | |

FOREIGN PATENT DOCUMENTS

| | | |
|---|---|---|
| DE | 29613123 | 11/1996 |
| EP | 0044889 | 2/1982 |
| EP | 0297705 | 1/1989 |

(56) References Cited

FOREIGN PATENT DOCUMENTS

| | | |
|---|---|---|
| EP | 0389112 | 9/1990 |
| EP | 0418608 | 3/1991 |
| EP | 0488813 | 6/1992 |
| EP | 0765514 | 4/1997 |
| EP | 1551621 | 7/2005 |
| EP | 1597061 | 11/2005 |
| FR | 1568013 | 5/1969 |
| FR | 2634931 | 2/1990 |
| FR | 2706214 | 12/1994 |
| FR | 2724479 | 3/1996 |
| GB | 2143204 | 2/1985 |
| GB | 2177373 | 1/1987 |
| GB | 2179910 | 3/1987 |
| JP | S55-041783 | 3/1980 |
| JP | 56145069 | 11/1981 |
| JP | S58-103523 | 6/1983 |
| JP | 6011370 | 1/1985 |
| JP | S62-138742 | 6/1987 |
| JP | 6443380 | 3/1989 |
| JP | H01-115773 | 8/1989 |
| JP | H0511575 | 3/1993 |
| JP | 07-306641 | 11/1995 |
| JP | 08137403 | 5/1996 |
| JP | H10-024681 | 1/1998 |
| JP | H10-177344 | 6/1998 |
| JP | H11-007246 | 1/1999 |
| JP | 11030954 | 2/1999 |
| JP | 11045051 | 2/1999 |
| JP | 2000-109762 | 4/2000 |
| JP | 2001101827 | 4/2001 |
| JP | 200282615 | 3/2002 |
| JP | 2004-034673 | 2/2004 |
| JP | 2005-128458 | 5/2005 |
| JP | 2004-569155 | 4/2006 |
| JP | 4029353 | 10/2007 |
| WO | 92/19457 | 11/1992 |
| WO | 95/34879 | 12/1995 |
| WO | 97/01495 | 1/1997 |
| WO | 99-31644 | 6/1999 |
| WO | 00-32412 | 6/2000 |
| WO | 01/84550 | 8/2001 |
| WO | 01-84550 | 11/2001 |
| WO | 01-89825 | 11/2001 |
| WO | 02/26483 | 4/2002 |
| WO | 2004/078468 | 9/2004 |

OTHER PUBLICATIONS

International Search Report dated Aug. 22, 2003 from corresponding International Application No. PCT/US2003/05996.

International Preliminary Report on Patentability dated Oct. 21, 2004 from corresponding International Application No. PCT/US2003/05996.

Observations by Third Parties under Article 115 EPC filed on Oct. 20, 2009 by Mintz Levin from corresponding European Application No. 03713742.9.

Notice of acceptance dated Nov. 5, 2008 from corresponding Australian Application No. 200321779.

Office action dated Apr. 15, 2010 from corresponding Australian Divisional Application No. 2008243283.

Office action dated Oct. 1, 2009 from corresponding Canadian Application No. 2,512,250.

Amendment dated Apr. 1, 2010 from corresponding Canadian Application No. 2,512,250.

Office action dated Jul. 25, 2008 from corresponding Chinese Application No. 03826036.0.

Amendment dated Nov. 18, 2008 from corresponding Chinese Application No. 03826036.0.

Notice of grant dated Jun. 24, 2009 from corresponding Chinese Application No. 03826036.0.

Voluntary amendment dated Dec. 3, 2009 from corresponding Divisional Chinese Application No. 200910006342.3.

Office action dated Mar. 10, 2010 from corresponding Chinese Divisional Application No. 200910006342.3.

Office action dated Jan. 2, 2008 from corresponding European Application No. 03713742.9.

Amendment dated May 12, 2008 from corresponding European Application No. 03713742.9.

Office action dated Apr. 15, 2010 from corresponding European Application No. 03713742.9.

Office action dated May 9, 2006 from corresponding Japanese Application No. 2004/569155.

Amendment dated Aug. 10, 2006 from corresponding Japanese Application No. 2004/569155.

Notice of allowance dated Aug. 30, 2007 from corresponding Japanese Application No. 2004/569155.

Office action dated Feb. 16, 2010 from corresponding Japanese Divisional Application No. 2007212089.

Office action dated Aug. 8, 2006 from Prior U.S. Appl. No. 10/504,600.

Amendment dated Oct. 31, 2006 from Prior U.S. Appl. No. 10/504,600.

Final rejection dated Jan. 19, 2007 from Prior U.S. Appl. No. 10/504,600.

Request for continued examination and amendment dated Apr. 17, 2007 from Prior U.S. Appl. No. 10/504,600.

Office action dated Jul. 2, 2007 from Prior U.S. Appl. No. 10/504,600.

Amendment dated Oct. 31, 2007 from Prior U.S. Appl. No. 10/504,600.

Final rejection dated Jan. 9, 2008 from Prior U.S. Appl. No. 10/504,600.

Notice of appeal and request for pre-appeal brief conference dated Apr. 9, 2008 from Prior U.S. Appl. No. 10/504,600.

Notice of pre-appeal brief review panel decision dated May 8, 2008 from Prior U.S. Appl. No. 10/504,600.

Restriction requirement dated Jul. 28, 2008 from Prior U.S. Appl. No. 10/504,600.

Response to restriction requirement dated Aug. 27, 2008 from Prior U.S. Appl. No. 10/504,600.

Office action dated Nov. 26, 2008 from Prior U.S. Appl. No. 10/504,600.

Amendment dated Feb. 24, 2009 from Prior U.S. Appl. No. 10/504,600.

Final rejection dated May 5, 2009 from Prior U.S. Appl. No. 10/504,600.

Request for continued examination and amendment dated Nov. 5, 2009 from Prior U.S. Appl. No. 10/504,600.

Examiner interview summary dated Nov. 24, 2009 from Prior U.S. Appl. No. 10/504,600.

Applicant statement of substance of interview dated Dec. 3, 2009 from Prior U.S. Appl. No. 10/504,600.

Examiner interview summary dated Dec. 29, 2009 from Prior U.S. Appl. No. 10/504,600.

Applicant statement of substance of interview dated Jan. 4, 2010 from Prior U.S. Appl. No. 10/504,600.

Amendment dated Jan. 12, 2010 from Prior U.S. Appl. No. 10/504,600.

Notice of Allowance dated Mar. 12, 2010 from Prior U.S. Appl. No. 10/504,600.

Notice of Allowance dated Jul. 12, 2010 from corresponding Canadian Application No. 2512250.

International preliminary report on patentability dated Jun. 2, 2010 from related International Application No. PCT/US2009/041586.

International search report and written opinion dated Dec. 4, 2009 from related International Application No. PCT/US2009/041586.

Request for Ex Parte Re-examination, Control No. 90/010,762, filed on Dec. 7, 2009 in U.S. Pat. No. 6,860,050.

Order dated Jan. 27, 2010 granting request for re-examination in Control No. 90/010,762.

Office action dated May 26, 2010 from re-examination Control No. 90/010,762.

Examiner's interview summary dated Jun. 25, 2010 from re-examination Control No. 90/010,762.

(56) References Cited

OTHER PUBLICATIONS

Amendment, Information disclosure statement, and patent owner's statement of substance of interview dated Jul. 1, 2010 from reexamination Control No. 90/010,762.
*Avery Dennison Corp.* v. *Continental Datalabel, Inc.*, 1:10CV-2744 (N.D. III.), complaint dated May 4, 2010.
*Avery Dennison Corporation* v. *3M* complaint dated May 4, 2010.
*Continental Datalabel, Inc.* v. *Avery Dennison Corporation*, 1:09-cv-5980, complaint dated Sep. 28, 2009.
Information disclosure statement dated Jul. 28, 2010 from reexamination Control No. 90/010,762,
*Avery Dennison Corporation* v. *Continental DataLabel, Inc.*, Answer to Complaint dated Jul. 25, 2010.
*Avery Dennison Corporation* v. *Continental DataLabel, Inc.*, Initial Disclosures of Defendant dated Aug. 6, 2010.
*Avery Dennison Corporation* v. *Continental DataLabel, Inc.*, pertinent document, Bates Nos. LC0000001 to LC0000004, cited in Initial Disclosures of Defendant dated Aug. 6, 2010.
*Avery Dennison Corporation* v. *Continental DataLabel, Inc.*, pertinent document, Bates Nos. LC0000005 to LC0000012, cited in Initial Disclosures of Defendant dated Aug. 6, 2010.
*Avery Dennison Corporation* v. *Continental DataLabel, Inc.*, pertinent document, Bates Nos. LC0000013 to LC0000119, cited in Initial Disclosures of Defendant dated Aug. 6, 2010.
*Avery Dennison Corporation* v. *Continental DataLabel, Inc.*, pertinent document, Bates Nos. LC0000120 to LC0000148, cited in Initial Disclosures of Defendant dated Aug. 6, 2010.
Office action dated Jun. 19, 2010 from Reexamination Control No. 95/001,351.
Request for ex parte reexamination dated Dec. 7, 2009 from Reexamination Control No. 90/010,761.
Order granting reexamination dated Feb. 19, 2010 from Reexamination Control No. 90/010,761.
Office action dated Jul. 8, 2008 from Reexamination Control No. 90/010,761.
Amendment dated Aug. 18, 2010 from Reexamination Control No. 95/001,351.
Inter Partes Request for Re-examination filed on May 4, 2010 in U.S. Pat. No. 7,709,071.
Interview Response and Amendment dated Feb. 10, 2010 from U.S. Pat. No. 7,709,071.
Notice of Allowability dated Feb. 11, 2010 from U.S. Pat. No. 7,709,071.
Examiner-Initiated Interview Summary for interview on Feb. 9, 2010 from U.S. Pat. No. 7,709,071.
Interview Response dated Jan. 12, 2010 from U.S. Pat. No. 7,709,071.
Claim Chart applying U.S. Pat. No. 2,681,732 and secondary references to the claims of U.S. Pat. No. 7,709,071.
Claim Chart applying U.S. Pat. No. 3,568,829 and secondary references to the claims of U.S. Pat. No. 7,709,071.
Claim Chart applying U.S. Pat. No. 3,038,597 and secondary references to the claims of U.S. Pat. No. 7,709,071.
Claim Chart applying JP Patent No. 56-145069 and secondary references to the claims of U.S. Pat. No. 7,709,071.
Claim Chart applying EP Patent No. 0488813 and secondary references to the claims of U.S. Pat. No. 7,709,071.
Claim Chart applying WO 95/34879 and secondary references to the claims of U.S. Pat. No. 7,709,071.
Chapter II Demand and A34 Amendment dated Mar. 3, 2010 from related International patent application No. PCT/US2009/041586.
Amendment dated Aug. 16, 2010 from related Japanese Patent Application No. 2007-212089.
Response dated Aug. 23, 2010 from related European Patent Application No. 03713742.9.
Third Party Comments dated Sep. 17, 2010 After Non-final Action in Reexamination of U.S. Pat. No. 7,709,071.
Exhibit dated Sep. 17, 2010 Filed by Third Party (Exhibit A) in Reexamination of U.S. Pat. No. 7,709,071.
Exhibit dated Sep. 17, 2010 Filed by Third Party (Exhibit B) in Reexamination of U.S. Pat. No. 7,709,071.
Information Disclosure Statement dated Sep. 17, 2010 Filed by Third Party in Reexamination of U.S. Pat. No. 7,709,071.
Response dated Oct. 3, 2010 from related Chinese Divisonal Patent Application No. 200910006342.3.
Office Action dated Nov. 1, 2010 from related Chinese Divisonal Patent Applicatoin No. 200910006342.3.
Reponse dated Nov. 1, 2010 After Non-final Action in Reexamination of U.S. Pat. No. 7,709,071.
*Avery Dennison Corporation* v. *Continental DataLabel, Inc.*, pertinent document, Bates Nos. LC0000001 to LC0000035, cited in Initial Disclosures of Defendant dated Aug. 6, 2010.
*Avery Dennison Corporation* v. *Continental DataLabel, Inc.*, pertinent document, Bates Nos. LC0000036 to LC0000078, cited in Initial Disclosures of Defendant dated Aug. 6, 2010.
*Avery Dennison Corporation* v. *Continental DataLabel, Inc.*, pertinent document, Bates Nos. LC0000079 to LC0000108, cited in Initial Disclosures of Defendant dated Aug. 6, 2010.
*Avery Dennison Corporation* v. *Continental DataLabel, Inc.*, pertinent document, Bates Nos. LC0000109 to LC0000128, cited in Initial Disclosures of Defendant dated Aug. 6, 2010.
*Avery Dennison Corporation* v. *Continental DataLabel, Inc.*, pertinent document, Bates Nos. LC0000129 to LC0000148, cited in Initial Disclosures of Defendant dated Aug. 6, 2010.
Non-final office action dated Nov. 29, 2010 from related U.S. Appl. No. 12/729,139.
Examiner's interview summary dated Dec. 20, 2010 from related U.S. Appl. No. 12/729,139.
Lawyer's seal "A" Dennison Mfg Co. 1913-1914 Tags & Speciatlies Catalog p. 71, located in 2900 Library D20 boxes (Feb. 17, 2005 List of references in U.S. Patent No. D514164).
Starburst Graphic #22 Admart Brochure Admart 20 Gose Pkie Danville KY 40422, located in 2900 Library D20 boxes (Feb. 17, 2005 List of references in U.S. Patent No. D514164).
"Advisory Action for Reexamination dated Nov. 12, 2010.", For U.S. Pat. No. 6,860,050 Control No. 90/010,762., 4 Pgs.
"Amendment After Final Office Action dated Oct. 27, 2010.", For Reexamination of U.S. Pat. No. 6,860,050 Control No. 90/010,762, 49 Pgs.
"Amendment after Final Rejection dated Jun. 29, 2011.", In Reexamination of U.S. Pat. No. 6,837,957 Control No. 90/010,761.
"Amendment After Non-final Office Action dated Sep. 13, 2010 .", For Reexamination of U.S. Pat. No. 6,837,957 Control No. 90/010,761., 38 Pgs.
"Appeal Brief and Amendment dated Aug. 4, 2011.", In Japanese Patent Application No. 2007-212089.,18 Pgs.
"Appeal Brief dated Oct. 31, 2011.", Dor Reexamination of U.S. Pat. No. 6,837,957 Control No. 90/010,761, pp. 1-38.
"Avery Answer to Counterclaims 1 and 2 dated Sep. 9, 2010.", In Case No. 1:10-cv-2744; *Avery Dennison Corp.* v. *Continental Datalabel, Inc.*, 21 Pgs.
"Avery Answer to First Amended Complaint and Counterclaims dated Nov. 18, 2009.", In Case No. 1:09-cv-05980; *Continental Datalabel, Inc.* v. *Avery Dennison Corporation.*, 31 Pgs.
"Avery Motion to Dismiss Counterclaims 3-5 Memorandum, and Exhibits dated Sep. 9, 2010.", In *Avery* vs. *Continental*; Civil Action No. 1:10-cv-2744.
"Avery Motion to Stay all Causes of Action, Memorandum, and Exhibits A-E dated Jul. 9, 2010.", In *Avery Dennison Corporation* vs. *Continental Datalabel*; Civil Action No. 1-10-cv-2744.
"Avery Objections and Responses to Continental's First Document Request dated Oct. 27, 2010.", In Civil Action No. 1:10-CV-2744; *Avery Dennison Corp.* v. *Continental Datalabel, Inc.*
"Avery Objections and Responses to Continental's First Interrogatories Dated Oct. 27, 2010.", In Civil Action No. 1:10-cv-2744; *Avery Dennison Corp.* v. *Continental Datalabel.*
"Avery Reply in Support of Motion to Dismiss Counterclaims 3-5 and Exhibits 1-4 dated Oct. 15, 2010.", In Civil Action No. 1:10-cv-2744; *Avery Dennison Corp.* v. *Continental Datalabel.*
"Avery Reply in Support of Motion to Stay All Causes of Action dated Aug. 13, 2010.", In Civil Action No. 1:10-cv-2744; *Avery Dennison Corp.* v. *Continental Datalabel, Inc.*, pp. 1-10.

(56) References Cited

OTHER PUBLICATIONS

"Avery Response to Initial Invalidity Contentions Oct. 1, 2010.", In Civil Action No. 1:10-cv-2744; *Avery Dennison Corporation* v. *Continental Datalabel, Inc.*, pp. 1-9.
"Continental Initial Non-infringement Contentions and Exhibit A", for *Avery Dennison Corporation* v. *Continental Datalabel, Inc.* dated Sep. 17, 2010., 260 Pgs.
"Continental Opposition to Avery Motion to Dismiss Counterclaims 3-5 dated Oct. 5, 2010. Motion, Exhibits A-J, and Declaration", In Civil Case No. 1:10-cv-2744; *Avery Dennison Corp.* v. *Continental Datalabel, Inc.*
"Continental Opposition to Avery Motion to Stay All Causes of Action dated Jul. 30, 2010, Exhibits A-J", In Civil Action No. 1:10-cv-2744; *Avery Dennison Corp.* v. *Continental Datalabel, Inc.*, 91 Pgs.
"Court Opinion Regarding Dismissal of Counterclaims 3, 4, and 5 dated Nov. 30, 2010.", IN Case No. 1:10-cv-02744; *Avery Dennison Corp.* vs. *Continental Datalabel, Inc.*
"First Amended Complaint and Exhibits A-E dated Oct. 21, 2009.", In Case No. 1:10-cv-02744; *Avery Dennison* v. *Continental Datalabel, Inc.*
"Letter to Douglas H. Pauley from Robert W. Unikel dated Nov. 10, 2010.", pp. 1-16.
"Letter to Douglas H. Pauley from Robert W. Unikel dated Sep. 30, 2010.", pp. 1-8.
"Letter to Douglas H. Pauley from Robert W. Unikel.", date Jul. 23, 2010., pp. 1-7.
"Letter to Robert W. Unikel from Maxwell J. Petersen dated Apr. 26, 2010.", pp. 1-2.
"Michael Fairley; Enclosure to Letter to D. H. Pauley dated Nov. 10, 2010.", Illustrated Encyclopedia of Labels and Label Technology, Tauras Publishing Ltd., London, First Published 2004., 6 pages.
"Canadian Office Action dated May 26, 2011.", In CA application No. 2,512,250., 2 Pgs.
Amendment under A19 with replacement sheets dated Oct. 16, 2003 from International Application No. PCT/US03/005996.
"Chinese Office Action Response dated Mar. 11, 2011.", In Application No. 200910006342.3., 4 Pgs.
"European Examination Report dated Nov. 3, 2011.", For European Patent Application No. 10009035.6., pp. 1-8.
"Examiner Interview Summary dated Jul. 1, 2011.", In Reexamination of U.S. Pat. No. 6,837,957 Control No. 90/010,761.,4 Pgs.
"Examiner Interview Summary dated Oct. 29, 2010.", For Reexamination of U.S. Pat. No. 6,860,050 Control No. 90/010,762., 4 Pgs.
"Examiner Interview Summary dated Sep. 1, 2010 .", For Reexamination of U.S. Pat. No. 6,837,957 Control No. 90/010,761., 4 Pgs.
"Extended Search Report dated Dec. 23, 2010.", For European Patent Application No. 10009035.6., 8 Pgs.
"Final Office Action dated Sep. 27, 2010.", For Reexamination of U.S. Pat. No. 6,860,050 U.S. Appl. No. 90/010,762., 26 Pgs.
"Final US Office Action dated Apr. 29, 2011.", In U.S. Appl. No. 90/010,761, 16 Pgs.
"Inter Partes Reexamination Request dated Apr. 21, 2011.", For U.S. Pat. No. 6,860,050.
"Letter Requesting Interview Summary with Examiner dated Aug. 27, 2010.", In Reexamination of U.S. Pat. No. 6,837,957 Control No. 90/010,761., 19 Pgs.
"Letter Requesting Interview with Examiner dated Jun. 22, 2011.", In Reexamation of U.S. Pat. No. 6,837,957 Control No. 90/010,761., 2 Pgs.
"Miscellaneous Incoming Letter for Reexamination dated Aug. 27, 2010.", In U.S. Pat. No. 6,837,957 Control No. 90/010,761., pp. 1-15.
Chapter II demand dated Aug. 5, 2004 from International Application No. PCT/US03/05996.
"Notice of Abandonment dated Apr. 6, 2011.", For Canadian Patent Application No. 2,512,250., 2 Pgs.
"Notice of Acceptance dated Apr. 21, 2011.", For Australian Divisional Application No. 2008243283., 3 Pgs.
"Notice of Appeal for Reexamination date Aug. 29, 2011 .", In U.S. Pat. No. 6,837,957 Control No. 90/010,761., 2 Pgs.
"Notice of Incomplete Ex Parte Reexamination Request dated Jan. 18, 2011.", In U.S. Pat. No. 6,860,050 Control No. 90/010,762., 4 Pgs.
"Notice of Intent to Issue a Reexamination Certificate dated Dec. 16, 2010.", Forr U.S. Pat. No. 6,860,050 Control No. 90/010,762., 12 Pgs.
"Notice of Reinstatement dated Apr. 20, 2011.", For Canadian Patent Application No. 2,512,250., 2 Pgs.
"Office Action for Japanese Patent dated Mar. 31, 2011.", In Application No. 2007-212089., 3 Pgs.
"Reexamination Petition Decision dated Mar. 17, 2011.", For U.S. Pat. No. 6,860,050.
"Request for Reinstatement and Amendment dated Mar. 25, 2011.", For Canadian Patent Application No. 2,512,250., 36 Pgs.
"Response After Non-final Action dated Aug. 19, 2011.", For U.S. Pat. No. 6,860,050 Control No. 95/001,608., pp. 1-62.
"Response to Extended Search Report dated Jul. 19, 2011.", In European Patent Application No. 10009035.6., 16 Pgs.
"Rexamination Certificate dated Mar. 22. 2011.", For U.S. Pat. No. 6,860,050 Control No. 90/010,762., 8 Pgs.
"Second Amendment After Final Rejection for Reexamination dated Nov. 22, 2010.", For U.S. Pat. No. 6,860,050 Control No. 90/010,762., pp. 1-56.
"Supplemental Amendment After Final Rejection dated Jul. 13, 2011.", In Reexamination of U.S. Pat. No. 6,837,957 Control No. 90/010,761., 8 Pgs.
"Third Party Requestor Comments After Non-final Action dated Sep. 15, 2011.", For Reexamination of U.S. Pat. No. 6,860,050 Control No. 95/001,608, 34 Pgs.
Continental Opposition to Avery Motion to Dismiss Counterclaims 3-5 dated Oct. 5, 2010, Motion, Exhibits A-J, and Declaration for *Avery Dennison Corporation* v. *Continental Datalabel, Inc.*
Non-final Office Action dated Jun. 16, 2011 for Reexamination of U.S. Pat. No. 6,860,050 (95/001,608).
Office Action dated Oct. 21, 2011 for Reexamination of U.S. Pat. No. 7,709,071 (95/001,351).
Office action dated Jul. 22, 2011 from related U.S. Appl. No. 12/729,139.

* cited by examiner

SHEET HAVING REMOVABLE LABELS

CROSS-REFERENCE TO RELATED APPLICATION

Priority is claimed under 35 U.S.C. §119(e) to U.S. Provisional Patent Application No. 61/047,724, filed Apr. 24, 2008, entitled "Sheet Having Removable Labels and Related Method," by Le-Hoa Hong, Martin Utz, Alejandro Gerardo Veyna Hernandez, and Gildardo Ramirez Villegas, which is incorporated by reference herein in its entirety.

TECHNICAL FIELD OF THE INVENTION

This invention is related to sheets of labels. The sheets of labels of the present invention provide for easy removal of the labels from a release-coated liner.

BACKGROUND

Pressure sensitive label sheets include a facestock, a layer of pressure sensitive adhesive and a release-coated liner. The labels are die cut into the facestock, and the sheet of labels can include a matrix surrounding at least a portion of the labels. In use, the labels are printed upon using a laser or inkjet printer or copier, removed from the release-coated liner and applied to a substrate.

A user can experience hardship in removing the labels from the release-coated liner because of difficulties in grasping the label. The difficulties can result in labels that have dog-eared or wrinkled corners, which impart an undesirable appearance. In addition, the labels can have the layer of pressure sensitive adhesive contaminated by excessive handling while attempting to grasp the adhered label. Further, the label can curl at the grasped area, which can cause the label to prematurely lift from the substrate after application.

For these reasons, there exists a need to easily remove pressure sensitive labels from a release-coated liner. The present invention satisfies this need.

SUMMARY

An exemplary embodiment of the invention is a label sheet including a facestock, and a liner releasably coupled to the facestock. The facestock includes a label and the liner includes a weakened separation line. The weakened separation line at least partially underlies the label. Also, the weakened separation line includes an apex. In a further feature, the weakened separation line includes another apex.

In other, more detailed, features of the invention, the label sheet includes a label that has an edge and the apex is adjacent to the edge of the label.

In additional features of the invention, the adhesive releasably couples the facestock to the liner. In further features, the adhesive is a pressure sensitive adhesive.

In even more additional features, the liner is a release-coated liner.

In even more additional features, the label sheet includes a first edge and a second edge. The weakened separation line extends between the first edge and the second edge.

In further additional features, the facestock includes a column of labels that includes the label. The weakened separation line at least partially underlies the column of labels.

Additional features include the weakened separation line having an apex that is truncated.

In even more additional features, the weakened separation line is free of ties at the apex.

In further features, the weakened separation line includes cuts and ties. In more features, each of the ties has a length that ranges from approximately 0.013 inch (0.33 mm) to approximately 0.050 inch (1.27 mm). In another feature, the length of the ties is approximately 0.03 inch (0.76 mm).

Another exemplary embodiment of the invention is a method of manufacturing a label sheet. The method includes providing a label stock that includes a facestock and a liner releasably adhered to the facestock. The method also includes cutting the facestock to form a label, and forming a weakened separation line in the liner. The weakened separation line at least partially underlies the label and includes an apex.

In a further feature, the label stock is configured in a roll and the method includes loading the roll onto a label press.

In yet another feature, the method includes sheeting the roll of label stock into individual sheets after forming a label and after forming a weakened separation line.

Another exemplary embodiment of the invention is a label sheet including a facestock and a liner releasably adhered to the facestock. The facestock has a first label and a second label adjacent to the first label. The liner has a first weakened separation line and a second weakened separation line. Each of the weakened separation lines has opposing ends. One of the opposing ends of the first weakened separation line intersects one of the opposing ends of the second weakened separation line, and the other opposing end of the first weakened separation line intersects the other opposing end of the second weakened separation line. The first weakened separation line at least partially underlies a portion of the first label, and the second weakened separation line at least partially underlies a portion of the second label. The liner is configured to separate along the first weakened separation line, such that after separation, the first label is partially separated from the liner.

In another feature, the liner is configured to split along either of the first weakened separation line or a second weakened separation line. Separation of the liner along one of the weakened separation lines results in one of the labels being partially separated from the liner.

In another feature, the liner is a release-coated liner.

In yet another feature, the facestock has a first column of labels that includes the first label and a second column of labels that includes the second label. The first weakened separation line underlies at least a portion of the first column of labels and the second weakened separation line underlies at least a portion of the second column of labels.

Another exemplary embodiment of the invention is a method of manufacturing a label sheet. The method includes providing a label stock that includes a facestock and a liner releasably adhered to the facestock. The method also includes cutting the facestock to form a first label and a second label adjacent to the first label. The method includes forming a first weakened separation line and a second weakened separation line in the liner. Each of the weakened separation lines has opposing ends. One of the opposing ends of the first weakened separation line intersects one of the opposing ends of the second weakened separation line, and the other opposing end of the first weakened separation line intersects the other opposing end of the second weakened separation line. The first weakened separation line at least partially underlies a portion of the first label, and the second weakened separation line at least partially underlies a portion of the second label. The liner is configured to separate along the first weakened separation line, such that after separation, the first label is partially separated from the liner.

In another feature, the liner is configured to split along either of the first weakened separation line or a second weakened separation line. Separation of the liner along one of the weakened separation lines results in one of the labels being partially separated from the liner.

In a further feature, the label stock is configured in a roll and the method includes loading the roll onto a label press.

In yet another feature, the method includes sheeting the roll of label stock into individual sheets after forming the label and after forming the weakened separation line.

BRIEF DESCRIPTION OF THE DRAWINGS

These and other features, aspects, and advantages of the present invention will become better understood with reference to the following description, appended claims, and accompanying drawings, where:

Unless otherwise indicated, the illustrations in the above figures are not necessarily drawn to scale.

DETAILED DESCRIPTION

Figure 1:
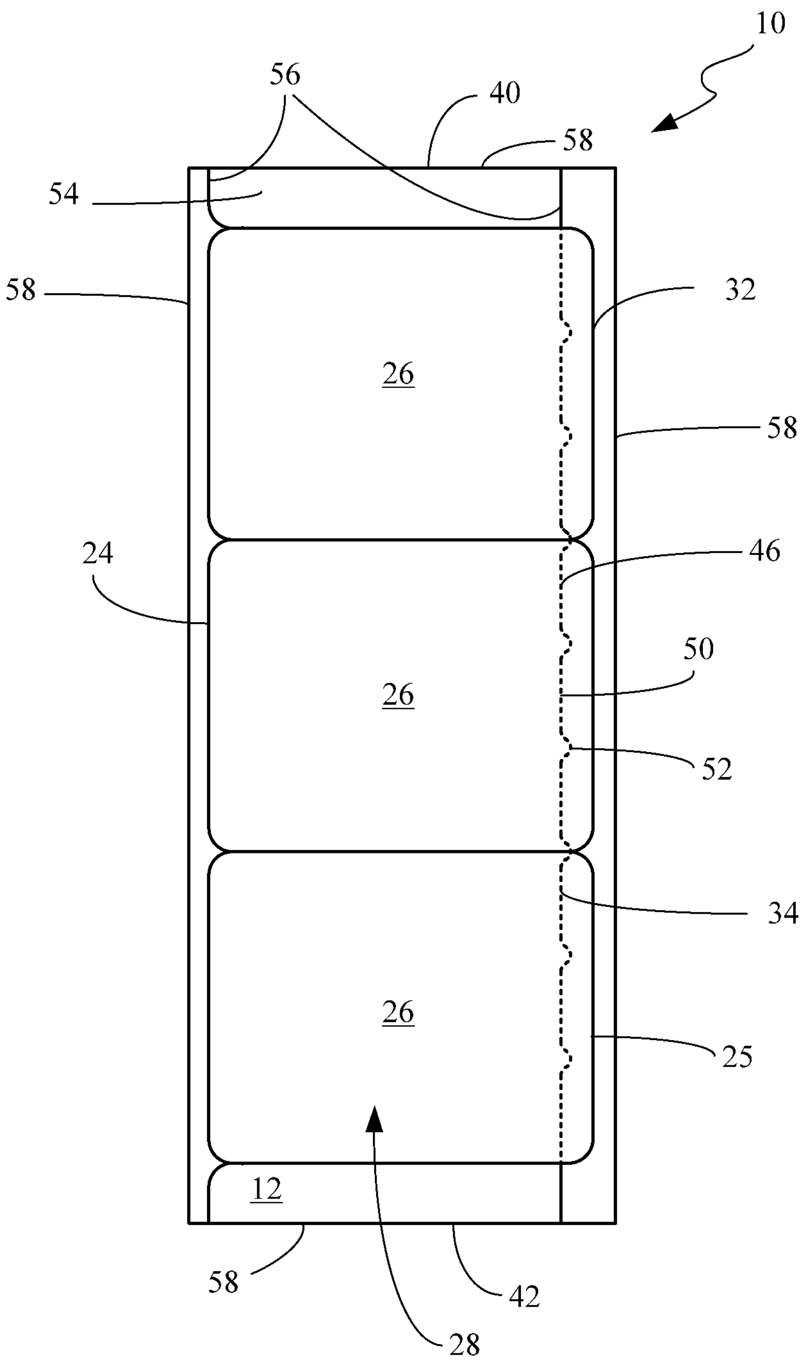
FIG. 1 is a plan view of the front of an embodiment of a label sheet according to the present invention.
Figure 12:
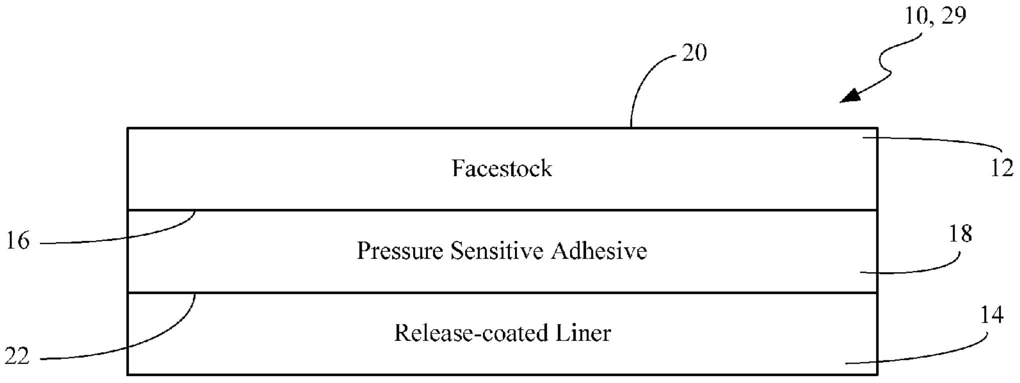
FIG. 12 is a sectional view of an example label sheet.

Referring to FIG. 1, a label sheet 10 according to the present invention can be made of typical materials used in label manufacture. A generic depiction of the cross-section of the label sheet is shown in FIG. 12. The label sheet includes a facestock 12 and a release-coated liner 14. The facestock is coated on one side 16 with a layer of pressure sensitive adhesive 18. The label sheet is suitable for use in laser and ink jet printers and copiers.

The facestock 12 can be made of any material that is known in the art including, for example, paper, cardstock, film, and foil. Further, the facestock can be a laminate of any of the known materials. To enhance printability, the facestock can be treated on an exposed surface 20. Suitable treatments include, for example, corona treatment and various coatings, for example, ink jet coatings, however, these treatments are not critical to the functioning of the inventive embodiments.

The release-coated liner 14 can also be any of those known in the art. Example release-coated liners include those made of paper and film, and can include laminates, for example, poly-coated paper. The release-coated liner includes a release coating on one side 22. The release coating allows the layer of pressure sensitive adhesive 18 to separate from the release-coated liner while remaining adhered to the facestock 12, thus exposing the adhesive and allowing the label to adhere to a substrate. Typical release coatings include, for example, silicones, waxes, fluorocarbons, and other low-surface-energy coatings.

Useful pressure sensitive adhesives 18 include, for example, rubber-based, and acrylic-based adhesives. The adhesives can be solvent-based, water-based emulsions and suspensions, or hot melt. Additionally, the adhesives can be categorized as permanent, removable, repositionable or ultraremovable, as some non-limiting examples. The layer of pressure sensitive adhesive can be applied by any known method, including but not limited to, for example, slot coating, curtain coating, knife coating, gravure coating and extrusion coating. It should be understood that if a low-adhesion pressure sensitive adhesive is employed, for example, a removable, repositionable or ultraremovable adhesive, the release-coated liner might not require a release coating.

Figure 3:
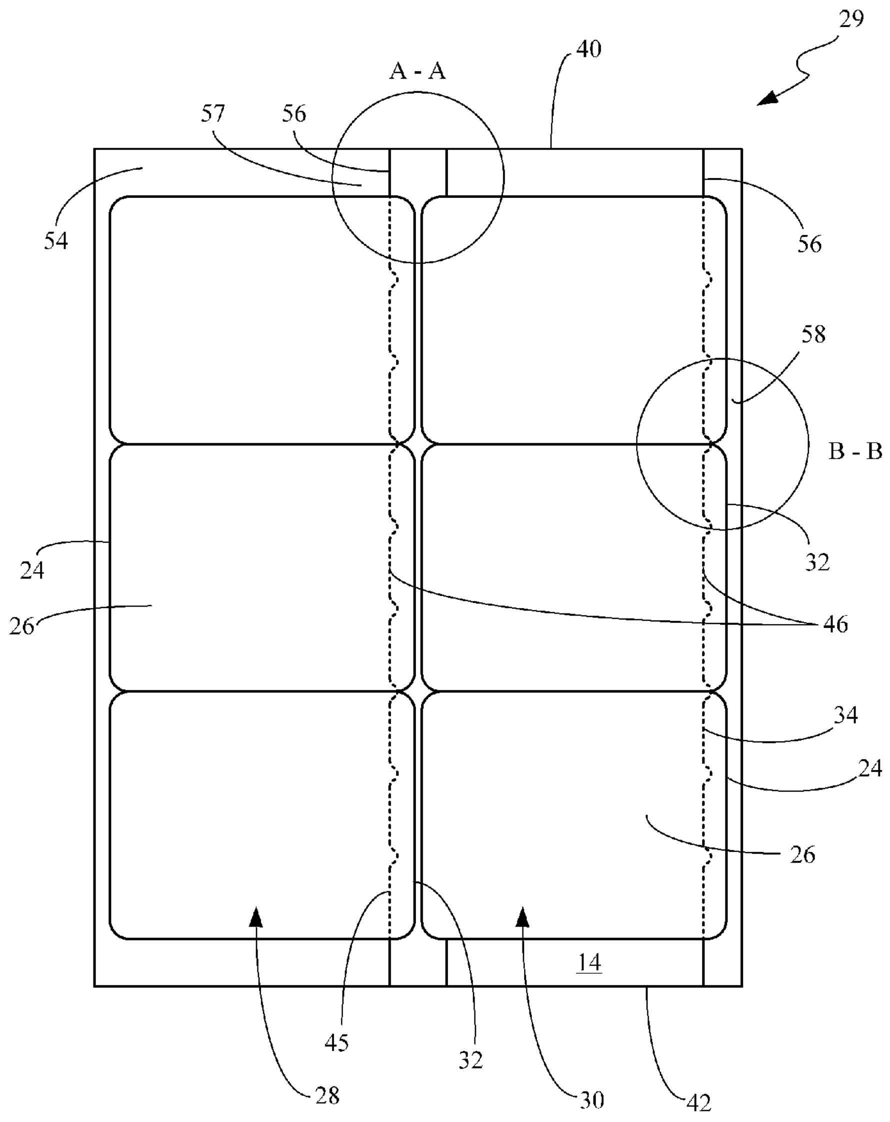
FIG. 3 is a plan view of the front of a label sheet of another embodiment of the present invention.

An embodiment of the present invention is shown in FIG. 1. The label sheet 10 illustrated in FIG. 1 includes a plurality of die cuts 24 in the facestock 12 forming labels 26. As used herein, the word "plurality" means two or more. The die cuts, i.e., continuous cuts, penetrate through the facestock but do not cut through the release-coated liner 14. The resulting labels form a column of labels 28. The labels can abut one another, as shown in FIG. 1, or can be spaced apart. Additionally, an alternative embodiment 29 is shown in FIG. 3 that includes two columns 28, 30 formed in the label sheet and spaced apart from one another. Other alternative embodiments can include columns that abut one another, with no space between adjacent columns. As used herein, the word "adjacent" means nearby. Thus, embodiments of the label sheets include a variety of label arrangements including a matrix-type layout wherein adjacent labels abut one another and a spaced-apart layout where adjacent labels do not abut one another, and combinations of the two layouts wherein some adjacent labels abut one another and other adjacent labels do not abut one another. In yet another embodiment, the column of labels can be a single label. Further, it should be understood that the die cuts forming the labels can be discontinuous cuts, for example, perforations, or cuts and ties, although discontinuous die cuts are less desirable.

The column of labels 28 can be further defined as including a linear edge 32. All the edges 25 of labels 26 in the column abut the linear edge, thus aligning the labels along the linear edge. An alternative embodiment includes a column of labels in a staggered configuration so that the labels do not share a common linear edge.

Figure 2:
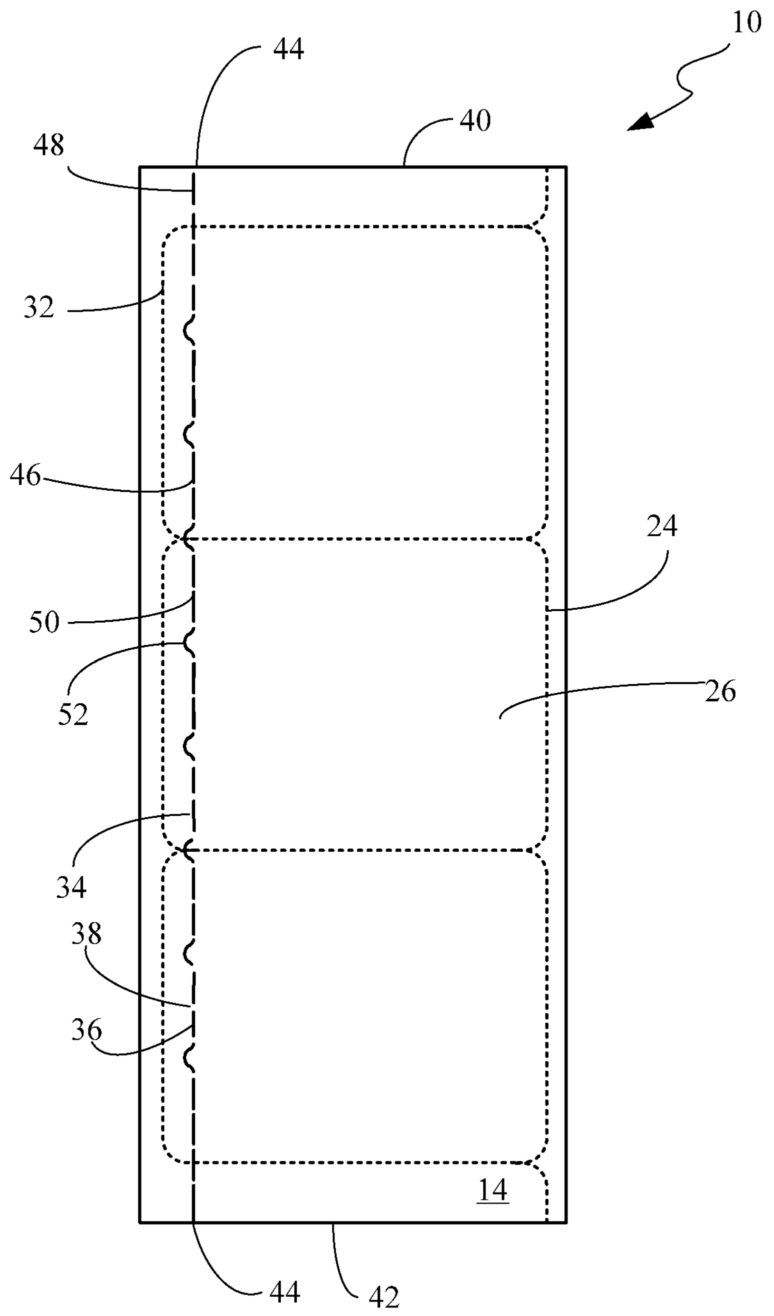
FIG. 2 is a plan view of the back of the label sheet shown in FIG. 1.
Figure 4:
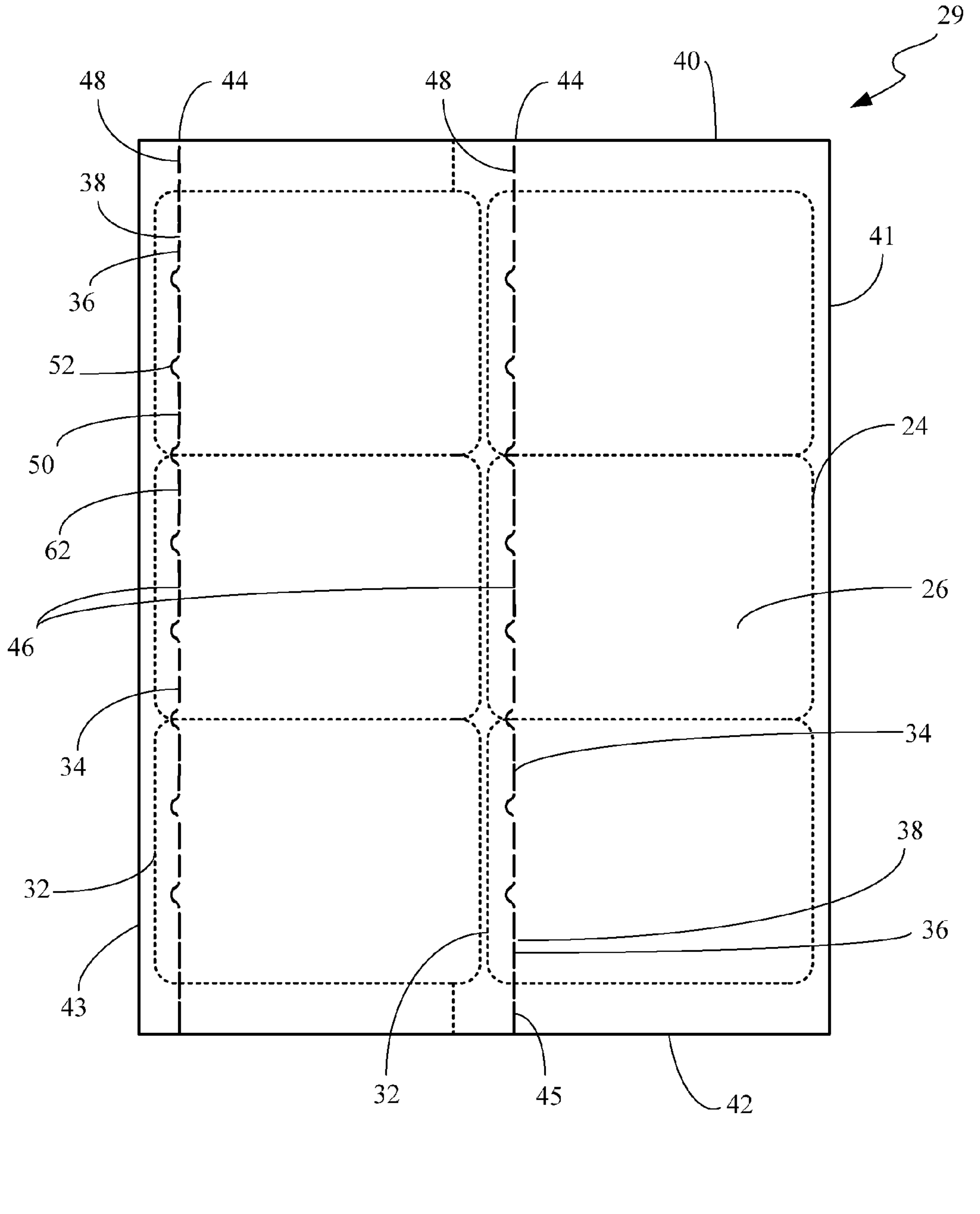
FIG. 4 is a plan view of the back of the label sheet shown in FIG. 3.

As best seen in FIG. 2, which illustrates the back surface of the label sheet 10 in FIG. 1, the release-coated liner 14 has a liner weakened separation line 34 formed therein. As shown, the liner weakened separation line is made of cuts 36 and ties 38. In alternative embodiments, the liner weakened separation line can be made of, for example, perforations, continuous die cuts, and scored lines. The liner weakened separation line can penetrate through the release-coated liner, but does not penetrate through the facestock 12. The liner weakened separation line extends from a first edge 40 of the label sheet 10 to an opposite second edge 42 of the label sheet. The end 44 of the liner weakened separation line can terminate at an edge with either a cut or a tie but preferably terminates with a tie. As shown in FIG. 4, which illustrates the back surface of the label sheet 29 in FIG. 3, an alternative embodiment can include additional liner weakened separation lines 45 configured as the above described liner weakened separation line. It should be appreciated that the liner weakened separation line can extend between a first edge and an adjacent edge 41 without departing from the spirit of the invention.

The liner weakened separation line 34 includes a major portion 46 and a minor portion 48. FIG. 1 best shows that the major portion (shown in phantom) underlies the column of labels 28 and is covered by the column of labels. The minor portion lies outside of the column of labels and thus does not underlie the column of labels.

The major portion 46 of the liner weakened separation line 34 includes a linear portion 50 and at least one curved segment 52, with the curved segment including only cuts. The linear first portion is aligned with and is parallel, and adjacent to the linear edge 32 of the column of labels 28. Preferably, the linear first portion is adjacent the linear edge of the column of labels so that folding the label sheet 10 along the linear first portion toward the release-coated liner 14 results in the labels separating from the release-coated liner along the linear edge of the column. In one embodiment, the linear first portion is within half an inch (13 mm) of the linear edge of the column. In another embodiment, the linear first portion is within a quarter of an inch (6 mm) of the linear edge of the column. In yet another embodiment, the linear first edge is within an eighth of an inch (3 mm) of the linear edge of the column. In yet another embodiment, the linear first portion is $\frac{3}{32}$ of an inch (2.4 mm) from the linear edge of the column.

Referring back to FIG. 1, the plurality of die cuts 24 in the facestock 12 forming labels 26 can also form a facestock waste portion 54. Additional weakened separation lines 56 in the facestock can further divide the waste portion into subdivided waste portions 58. The additional weakened separation lines can be continuous die cut lines, or alternatively, can be discontinuous lines, for example, perforations or cuts and ties. In one embodiment, all of the subdivided waste portions remain attached to the release-coated liner 14 after manufacture of the label sheet 10 is complete. In another embodiment, at least one of the subdivided waste portions is removed from the release-coated liner.

Figure 5:
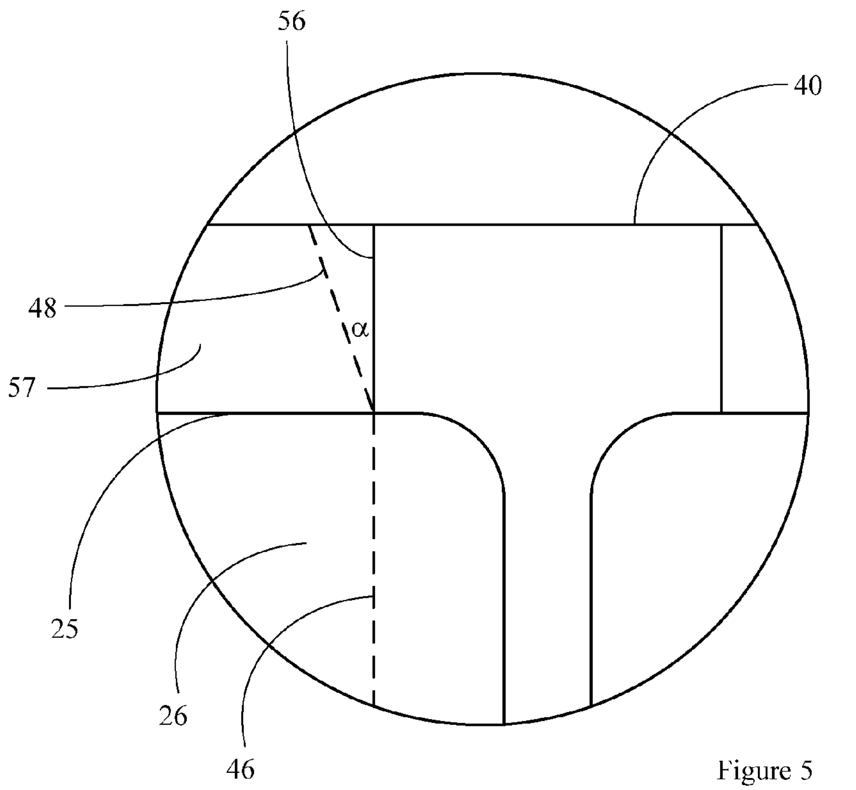
FIG. 5 is an expanded plan view of an embodiment at region A-A of FIG. 3.
Figure 6:
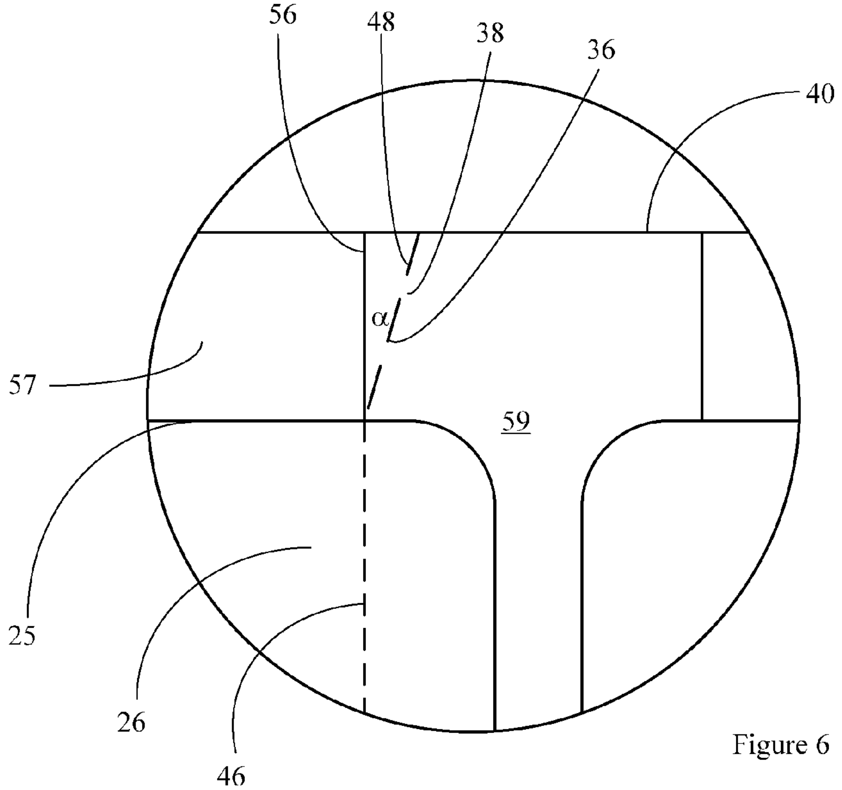
FIG. 6 is an expanded plan view of another embodiment at region A-A of FIG. 3.

FIGS. 5-8 are alternative embodiments viewed at region A-A on FIG. 3. Turning first to FIGS. 5 and 6, the minor portion 48 of the liner weakened separation line 45 can be seen in relation to an additional weakened separation line 56 in the facestock 12. The projection of the minor portion of the liner weakened separation line 45 onto the plane of the label sheet 29 is shown intersecting the additional weakened separation line 56 in the facestock at the edge 25 of a label 26 at an angle $\alpha$. In FIG. 5, the minor portion of the liner weakened separation line 45 underlies a subdivided waste portion 57 that remains on the release-coated liner 14. In FIG. 6, the minor portion of the liner weakened separation line 48 is in a portion 59 of the release-coated liner from which the subdivided waste portion 58 has been removed. Thus, the minor portion does not underlie the subdivided waste portion. While FIGS. 5 and 6 show the projection of the minor portion of the liner weakened separation line 45 onto the plane of the label sheet intersecting the additional weakened separation line 56 in the facestock at the edge of a label, it can intersect at a position other than at the edge of the label.

Figure 7:
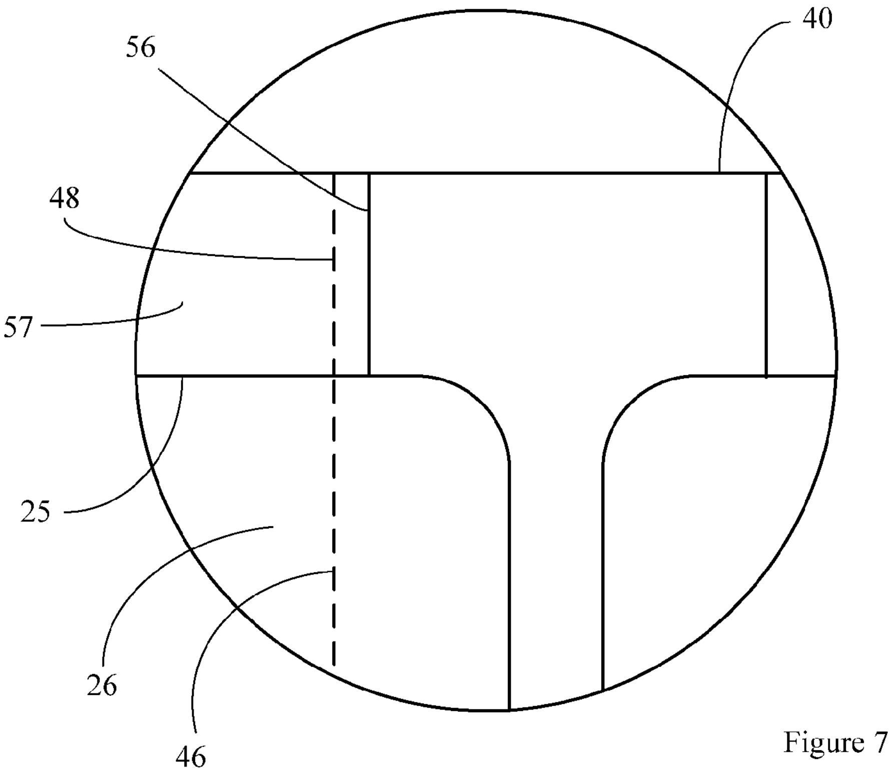
FIG. 7 is an expanded plan view of another embodiment at region A-A of FIG. 3.
Figure 8:
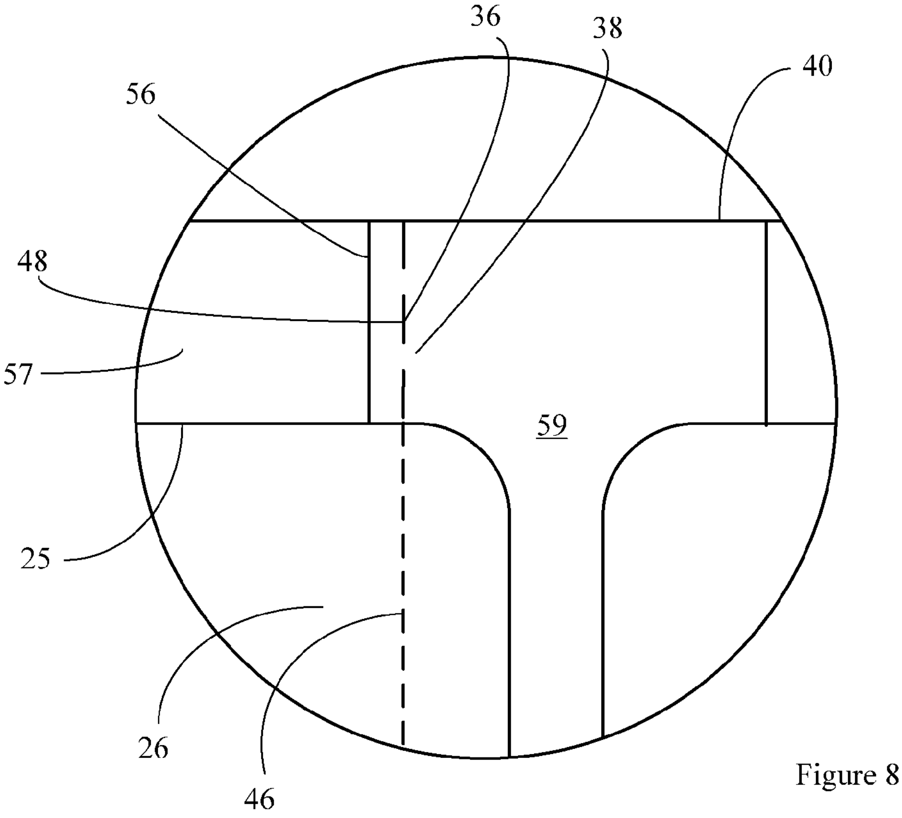
FIG. 8 is an expanded plan view of another embodiment at region A-A of FIG. 3.

In alternative embodiments, the projection of the minor portion does not intersect the additional weakened separation line 56. FIGS. 7 and 8 illustrate that the projection of the liner weakened separation line 45 onto the plane of the label sheet can be parallel to the additional weakened separation line 56 in the facestock. FIG. 7 shows the projection of the liner weakened separation line 45 onto the plane of the label sheet on one side of the additional weakened separation line 56 in the facestock and is underlying a subdivided waste portion 57 that remains on the release-coated liner. FIG. 8 shows the projection of the liner weakened separation line 45 onto the plane of the label sheet on the other side of the additional weakened separation line 56 (in comparison to the embodiment illustrated in FIG. 7) in the facestock and is in a portion 59 of the release-coated liner above which the subdivided waste portion 58 has been removed. Thus, the minor portion does not underlie the subdivided waste portion. As can be appreciated from FIGS. 1 and 3, the projection of the liner weakened separation line 46 onto the plane of the label sheet can be coincident with the additional weakened separation line 56 in the facestock.

Figure 9:
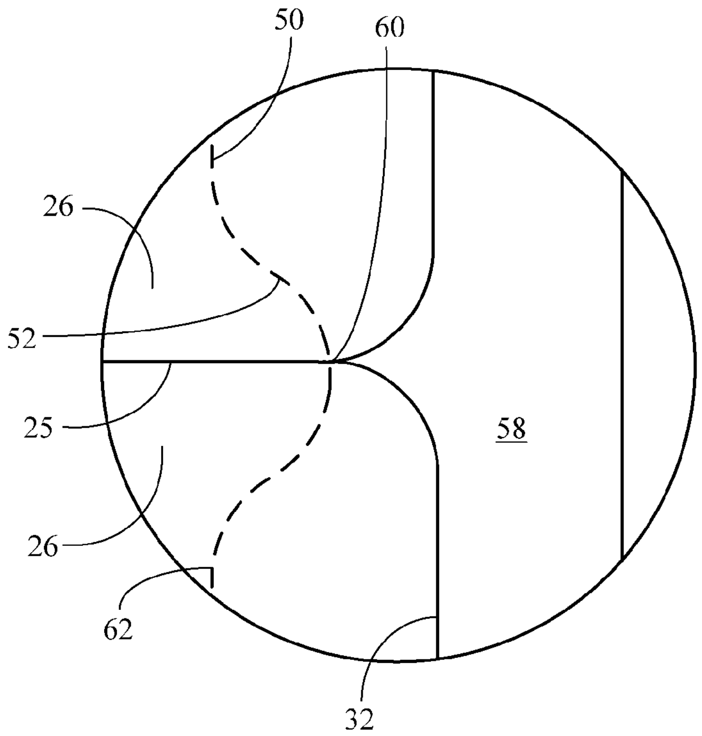
FIG. 9 is an expanded plan view of an embodiment of region B-B of FIG. 3.
Figure 10:
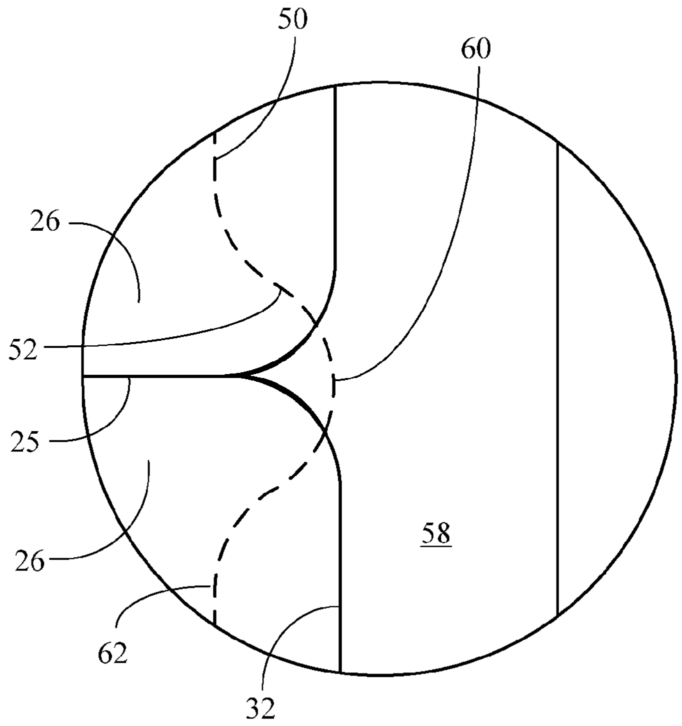
FIG. 10 is an expanded plan view of another embodiment at region B-B of FIG. 3.
Figure 11:
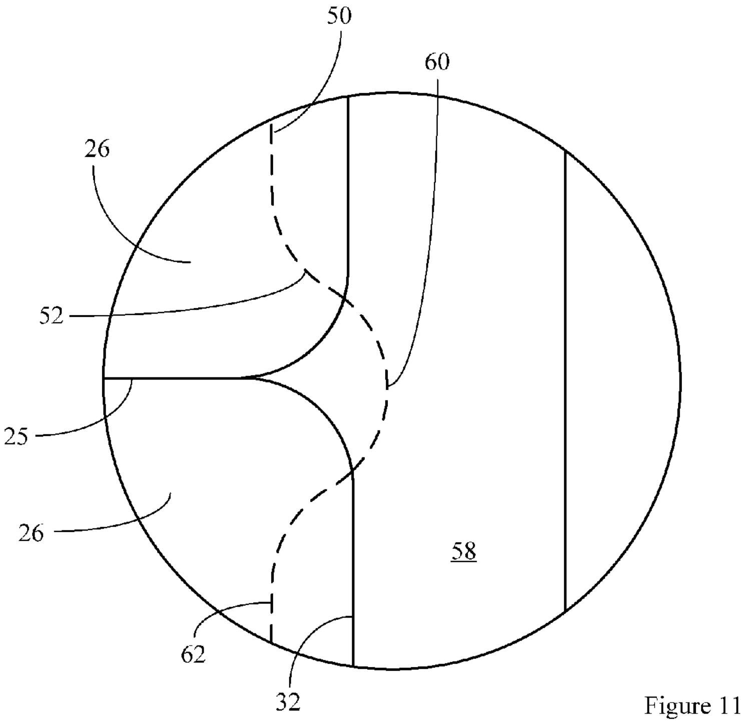
FIG. 11 is an expanded plan view of another embodiment at region B-B of FIG. 3.

FIGS. 9-11 are alternative embodiments viewed at region B-B on FIG. 3. The at least one curved segment 52 of the major portion 46 of the liner weakened separation line 34 can be characterized as having an apex 60. The apex of the curved segment is the point of the curved segment that is at the furthest distance from a line 62 defined by the linear portion 50 of the liner weakened separation line. FIG. 9 shows that the apex of the curved segment adjacent to the linear edge 32 can underlie the column of labels 28. FIG. 10 shows another embodiment wherein the apex is adjacent to, and extends to, the linear edge 32 of the column of labels. FIG. 11 shows yet another embodiment wherein the apex does not underlie the column of labels and extends beyond the linear edge. In each of these embodiments, the curved segment is shown spanning two adjacent labels. In alternative embodiments, the curved segment spans a label and the subdivided waste portion 58.

Figure 13:
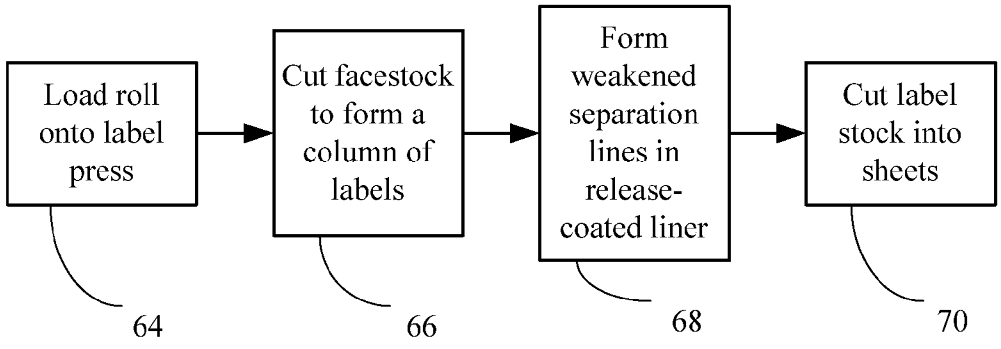
FIG. 13 is a flow chart of a manufacturing process for making a label sheet according to the present invention.

The label sheet 10, 29 described above can be manufactured by the following process on conventional label converting equipment known in the art. The process is shown as a flow chart in FIG. 13. A label stock including a facestock 12 and release-coated liner 14 releasably adhered together with a layer of pressure sensitive adhesive 18 is loaded in roll form onto a label press at step 64. The label stock can include surface treatments and coatings to enhance printability in laser and inkjet printers, and copiers. The label stock is unrolled into a web on the label press and the facestock is die cut into at least one column of labels 28 at a facestock station at step 66. The facestock can include waste portions 58 defined by additional weakened lines 56 in the facestock that are usually formed at the same time as the column of labels or can be formed at a separate station. The release-coated liner has weakened separation lines 34 formed in it at step 68, usually at a liner station separated from the facestock station. The weakened separation lines on the release-coated liner include major 46 and minor 48 portions described above, as well as a linear portion 50 and at least one curved segment 52. The weakened separation lines on the release-coated liner are located such that the major portion underlies the column of labels. At another station, the web of label stock is cut into sheets at step 70, typically of sizes suitable for desktop printers and copiers, for example, 8.5 inches×11 inches (215.9 mm×279.4 mm), 4 inches×6 inches (101.6×152.4 mm), 8.5 inches×14 inches (215.9 mm×355.6 mm), and A4 (8.3 inches×11.7 inches, 210 mm×297 mm). The sheets of label stock can be packaged using the label converting equipment or can be packaged using a separate packaging machine.

Figure 14:
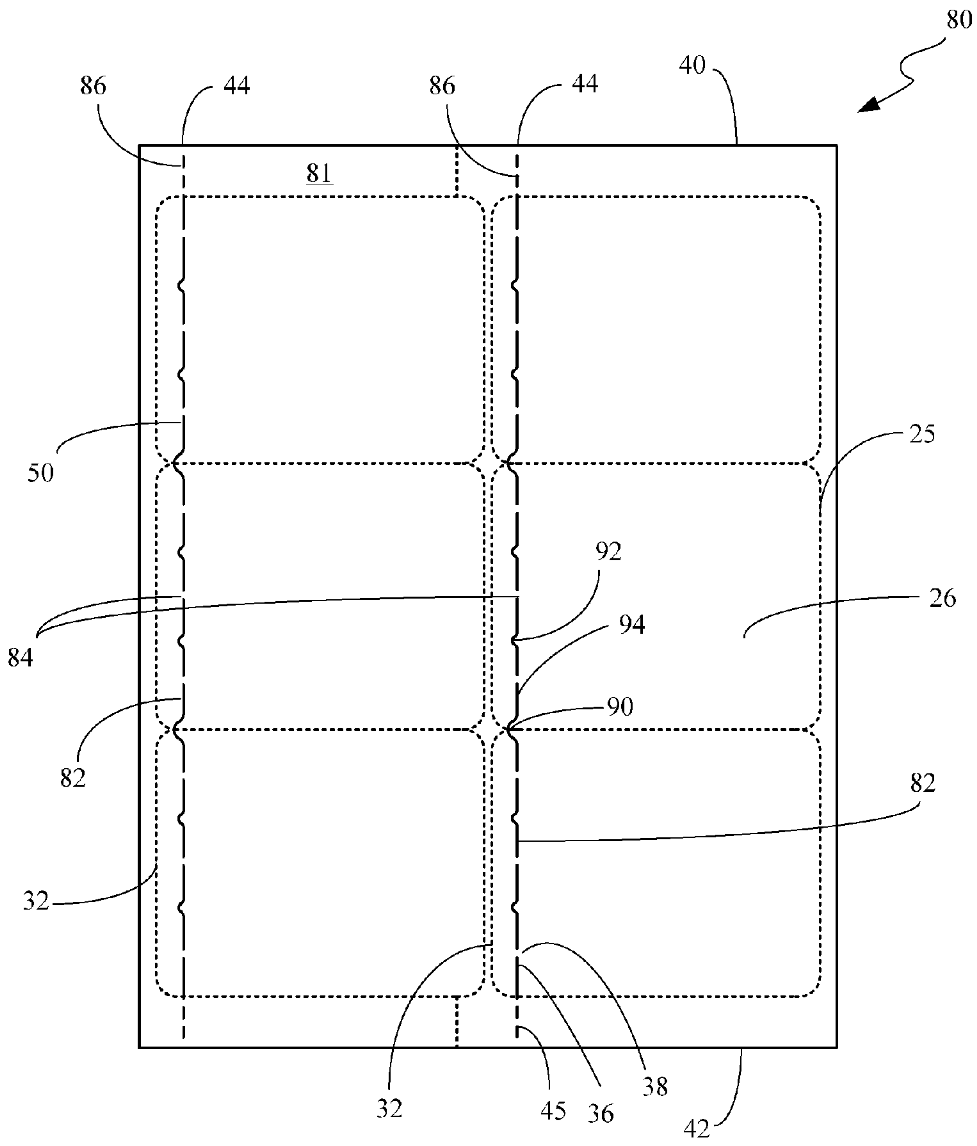
FIG. 14 is a plan view of the back of a label sheet of embodiment of the present invention.

The back side of a label sheet 80 of another embodiment of the current invention is shown generally in FIG. 14. The sheet depicted is similar to the label sheet 29 depicted in FIGS. 3 and 4. The release-coated liner 81 includes liner weakened separation lines 82 that are parallel to and adjacent the edges 25 of labels 26 die cut in the facestock sheet 12. The liner weakened separation lines are formed with a series of cuts 36 and ties 38. The liner weakened separation lines include major portions 84 underneath the labels and minor portions 86 under a waste portion 58 of the facestock sheet.

The major portions 84 of the weakened separation lines 82 include two types of curved segments 90, 92. Both types of curved segments are free of ties, and include only die cuts. Curved segment 90 is similar to curved segment 60 shown in FIGS. 9-11. Curved segment 90 is generally aligned between two adjacent labels 26 and can completely underlie the labels or extend a distance past the edge 25 of the labels as described elsewhere herein. Thus, portions of curved segment 90 span or underlie two adjacent labels. Additionally, a curved segment 90 can span or extend across the die cut 24 between a label and the waste portion 58.

Curved segments 92 are smaller than curved segments 90 and of a similar shape. Each curved segment 92 completely underlies a single label 26. As shown in FIG. 14, two curved segments underlie each label, approximately equally spaced across the label. However, any number of curved segments can underlie a single label, and the curved segments need not be equally spaced or symmetrically spaced under the label. Additionally, the curved segments 92 can be the same size as, or larger than, the curved segments 90.

Figure 15:
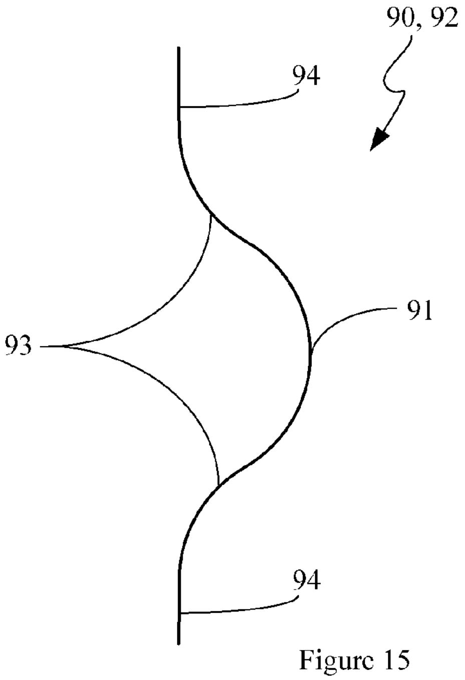
FIG. 15 is an expanded view of an embodiment of a release-coated liner cut.
Figure 16:
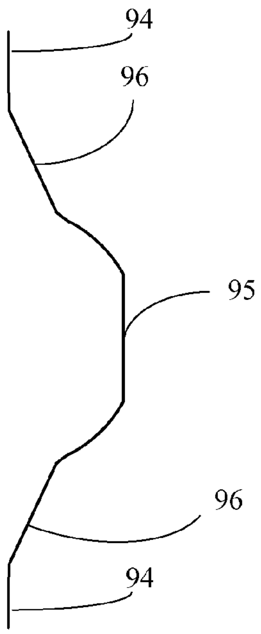
FIG. 16 is an expanded view of another embodiment of a release-coated liner cut.
Figure 17:
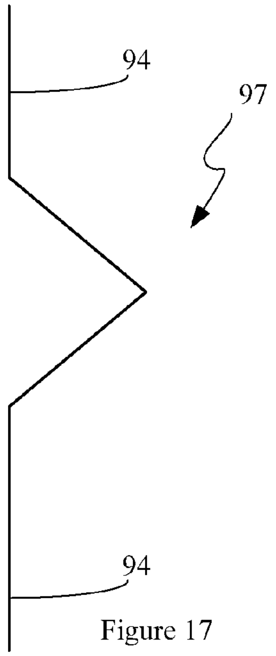
FIG. 17 is an expanded view of an another embodiment of a release-coated liner cut.
Figure 18:
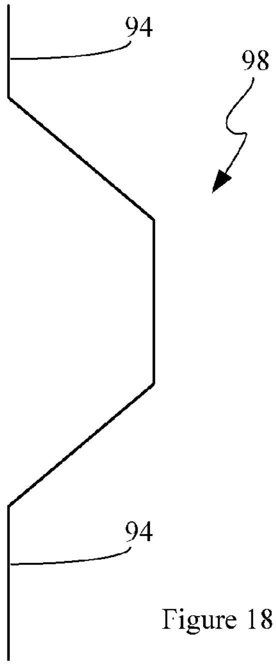
FIG. 18 is an expanded view of an another embodiment of a release-coated liner cut.

As shown in FIG. 15, the curved segments 90, 92, also referred to as shapes, are rounded. The shapes include rounded apices 91 with rounded transitions 93 to the linear portions 94 of the linear weakened separation line 82. Alternative shapes are also useful. For example, as shown in FIG. 16, the apices can be cut off, or truncated, to form linear portions 95 that are parallel, or alternatively, skewed relative to a label edge 25. The transitions 96 between the curved segments can be linear as well. Thus, the curved segments need not necessarily be curved and can be square, rectangular, trapezoidal, elliptical, triangular, or other shapes. FIGS. 17 and 18 illustrate embodiments of segments 90 and 92 as triangle-shaped cuts 97 and trapezoid-shaped cuts 98. Additionally, the two types of curved segments 90, 92 can be different shapes within a single linear weakened separation line.

Figure 19:
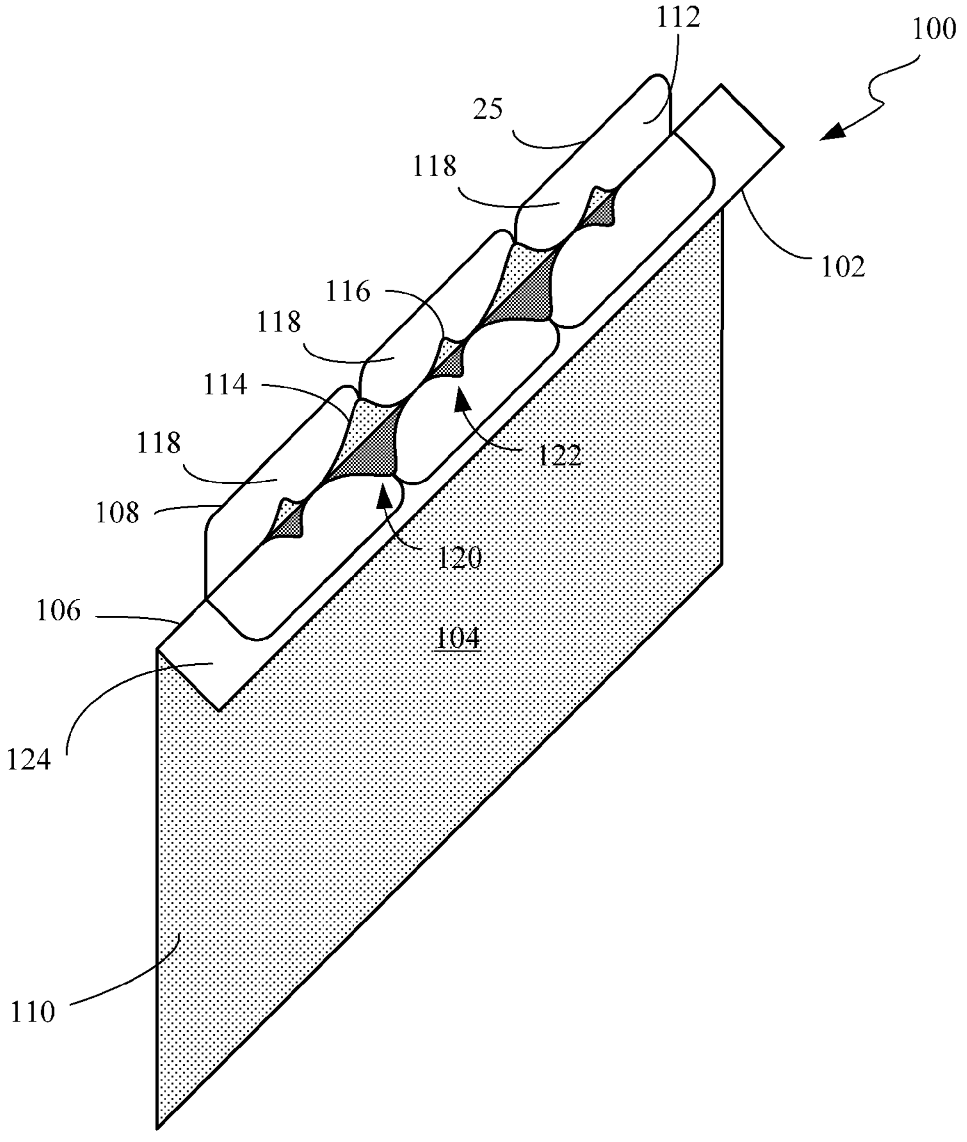
FIG. 19 is a perspective view of a folded example label sheet.

FIG. 19 illustrates a label sheet 100 of another embodiment of the present invention. The label sheet is shown with an edge 102 folded toward the release-coated liner side 104 along a linear weakened separation line 106. Folding the edge separates a portion 108 of the labels 118 from the release-coated liner 110 and exposes pressure sensitive adhesive 112 on the back side of the labels. The labels are easily removed from the label sheet by grasping the partially separated labels and peeling them from the rest of the release-coated liner.

With the linear weakened separation line 106 adjacent the edge 25 of the labels 118, and the apices 60 of the shapes adjacent the edge of the labels, when the edge 102 of the sheet 100 is folded, the relatively stiff labels 118 separate from the release-coated liner. The curved portions 114 and 116 of the liner weakened separation line 82 being free of ties, remain adhered to the labels, producing holes 120 and 122, respectively, in the folded edge of the release-coated liner 110. The separated portions 108 of the labels include facestock and adhesive in the areas not covered by the curved portions. The areas of the labels covered by the curved portions include facestock 124, adhesive 112 and release-coated liner 110, thereby stiffening that portion of the label sufficiently to cause separation from the release-coated liner upon folding. The amount of stiffening can be controlled, for example, by altering the sizes of the curved portions, the number of curved portions, and the shape of curved portions. The separation of labels made of thinner, more flexible materials, for example, film labels instead of paper labels, is improved by increasing the number of the curved portions, the increasing size of the curved portions, or by altering the shape of the curved portions, or by any combination of these factors.

As discussed previously, the major portions 46 and 84 of the weakened separation lines 34 and 82, respectively, include cuts 36 and ties 38. The lengths of the cuts and the lengths of the ties can vary. Ties can range in length from approximately 0.013 inches (0.33 mm) to approximately 0.050 inches (1.27 mm) long. For example, in one embodiment, the ties are 0.030 inches (0.76 mm) long. Cuts can be any length, with the length of each cut being determined by the spacing between adjacent ties along a weakened separation line. In one embodiment, the cuts have a length from approximately 0.042 inches (1.06 mm) to approximately 0.047 inches (1.19 mm) long. Other lengths of cuts and ties are possible without deviating from the spirit of the invention, for example, microperforations can be used, in which the cuts and ties are much smaller. In one embodiment, curved segments 52, 90, 92 are separated from linear first portions 50, 94 by bounding ties. Embodiments with multiple weakened separation lines can have different cut and tie lengths on different weakened separation lines. Additionally, minor portions 48, 86 of the weakened separation lines can have cuts and ties in which the cuts are shorter in length as the weakened separation line approaches the edge 40 of the sheet 10, 29, 80. Alternatively, in other embodiments, there are no cuts and ties within 0.25 inches (6.35 mm) of the edge of the sheet.

Figure 20:
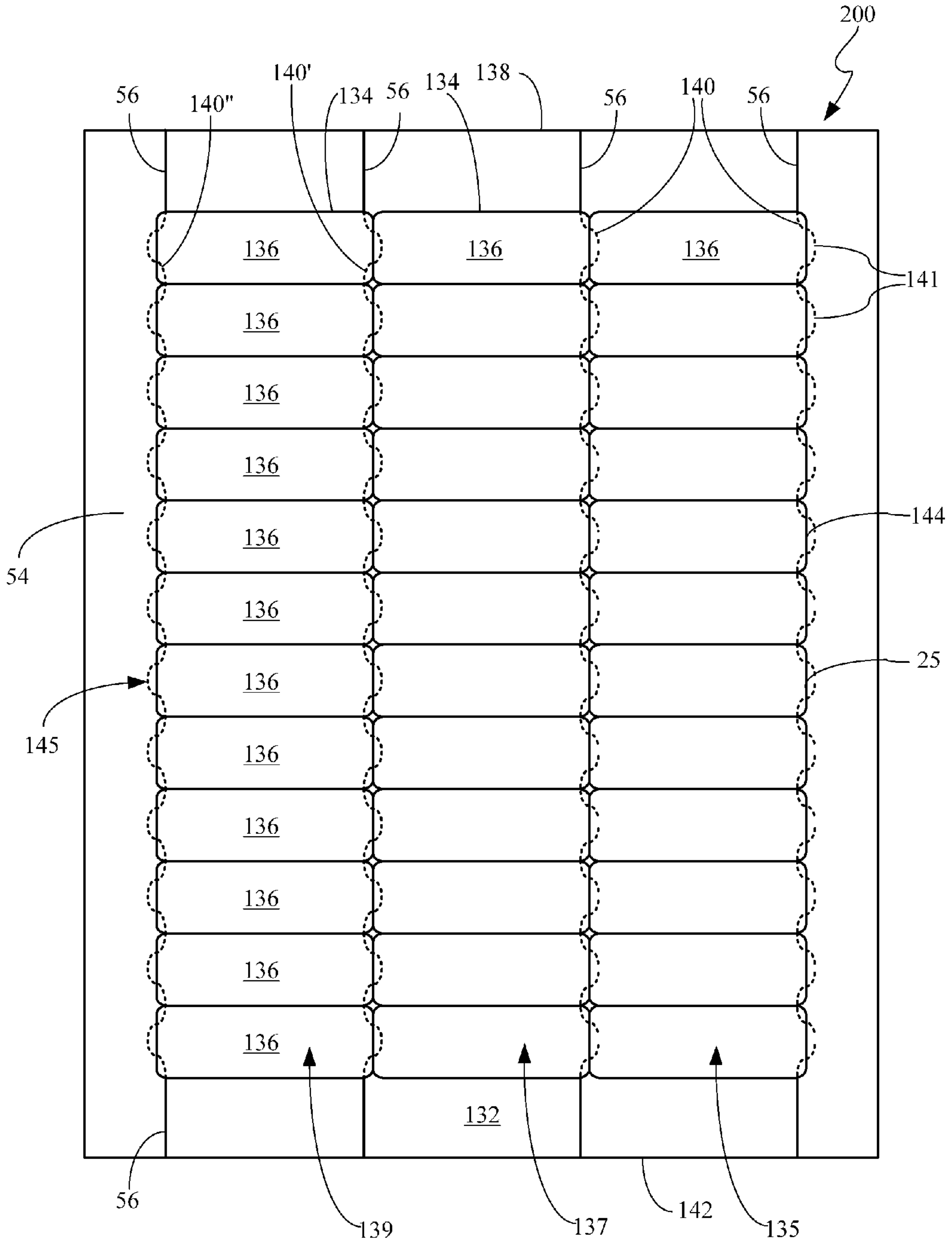
FIG. 20 is a plan view of the front of a label sheet of embodiment of the present invention.

With reference now to FIG. 20, another embodiment of a label sheet 200 is formed of a release-coated liner sheet 14 with a facestock sheet 132 releasably adhered thereto with pressure sensitive adhesive. A plurality of die cut lines 134 are formed in the facestock to define releasable labels 136 therein. The labels are shown as being ordered in a plurality of columns 135, 137, 139 and having a generally rectangular shape, and as such the labels can have any shape. Furthermore, although the labels are shown as abutting adjacent labels, an individual having ordinary skill in the art will understand that this embodiment is typically practiced to obtain the maximum number of labels per label sheet but there is no requirement imposed by the present disclosure that adjacent labels abut one another. Furthermore, in embodiments where adjacent labels do not abut, the area between labels can have facestock thereupon or can be devoid of facestock. Similarly, in the embodiments shown, the border area 54 surrounding the labels 136 can have facestock thereupon or can be devoid of facestock.

Label sheet 200 further includes weakened separation lines 140, 140', 140" in the release-coated liner 14 that extend from the top edge 138 to the bottom edge 142 of the label sheet along a selected edge 144 of each column 135, 137, 139 of labels 136 and are formed with a generally sinusoidal shape 145 that crosses the selected edge of each label twice. The weakened separation lines partially extend past the selected edge of each respective label and partially extend beneath the label. FIG. 20 illustrates three such lines 140, 140' in the release-coated liner that extend along the right edge of each column of labels as well as one weakened separation line 140" in the release-coated liner that extends along the left edge of the leftmost column of labels. A corresponding weakened separation line 56 in the facestock 132 is also provided over each portion of each liner weakened separation line that extends from the edge of the label sheet to the nearest label. The generally sinusoidal weakened separation lines in the release-coated liner are further formed so that they extend beneath the label as they cross adjacent labels in the same column, and extend past the label generally in the middle of each label.

In one embodiment, the weakened separation lines 140 in the release-coated liner 14 are formed with ties 141 (continuous, or uncut portions), as shown in FIG. 20. In the specific, illustrative, non-limiting embodiment shown, the ties 141 are disposed at the apex 133 of the weakened separation line in the release-coated liner where the line extends past the edge 25 of each label 136. However, in such embodiments where the weakened separation line in the release-coated liner is formed with ties, the ties can be disposed at other locations along the respective line. In other embodiments, there are no ties in the weakened separation line 140' and 140" in the release-coated liner.

Figure 21:
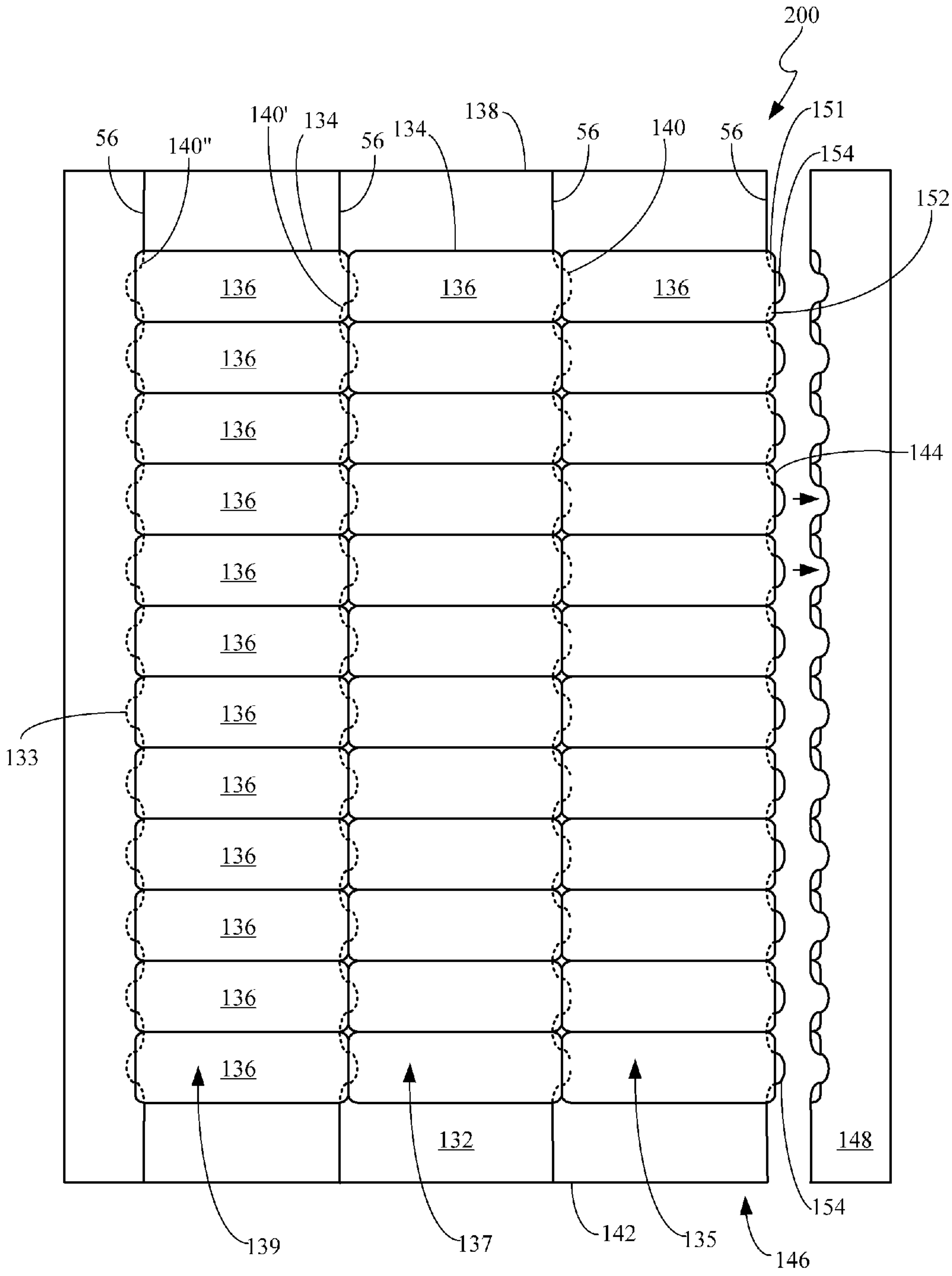
FIG. 21 is a plan view of the label sheet of FIG. 20 with a portion of the label sheet separated.

With reference to FIG. 21, the label sheet 200 of the embodiment shown in FIG. 20 can be grasped with one hand on one side of the weakened separation line 140 and the other hand on the other side of the selected line (in FIG. 21, the line in the release-coated liner that is right-most in the sheet 200 is selected). The label sheet separates along the selected weakened separation line in the release-coated liner into two pieces 146, 148 when the two hands pull the two pieces apart. The right-most piece 148 of the label sheet separates along the right-most weakened separation line in the release-coated liner 14 as well as the respective weakened separation lines 56 in the facestock 132 from the rest of the label sheet 146. The upper and lower right-hand corners 151, 152 of each label 136 in the right-most column 135 of labels are exposed facilitating the grasping and peeling of the respective label off the release-coated liner sheet. The separation of the right-most piece of the label sheet also leaves portions 154 of the release-coated liner exposed that correspond to the portions of the weakened separation line in the release-coated liner that extend beyond the edge of each label. These exposed release-coated liner portions can also aid the user in separating the respective label by allowing the user to grasp the exposed release-coated liner portion and peel it back or away from the label, which can also be done concurrently with grasping a corner of the label and peeling forward or away from the release-coated liner.

In the manner described above, each column of labels can be individually separated from an adjacent column of labels prior to removing the labels therefrom. Additionally, in an embodiment that includes a weakened separation line 140" in the release-coated liner 14 formed along the left edge of the left-most column of labels as shown in the embodiments of FIG. 20, the process can also begin by separating the left-most portion of the label sheet 200 from the rest of the label sheet. As shown, such a left-most weakened separation line in the release-coated liner would preferably be essentially a mirror image of a right-most weakened separation line in the release-coated liner.

The generally sinusoidal shape 145 of the weakened separation lines 140 in the release-coated liner 14 shown in FIGS. 20 and 21 is for illustration purposes only. In additional embodiments, liner weakened separation lines can be formed along any other practical path provided that they enable the separation of each portion of the label sheet 200 from the adjacent portion (e.g., 146, 148) with relative ease and without tearing of the release-coated liner 14 or of the facestock 132 along any path other than along the weakened separation lines 140, 140', 140" in the release-coated liner and the weakened separation lines 56 cut in the facestock 12, and leaving at least a portion 151, 152 along the edge 25 of each label 136 exposed for ease of separation from the release-coated liner. Furthermore, the overall shapes, the actual dimensions, period, and amplitude of the cuts in the release-coated liner can vary according any of a number of factors, including the thickness of the release-coated liner and the facestock, the depth and/or type of the respective cuts, the strength of the adhesive, aesthetics, etc.

In an alternative method of use, a portion of the label sheet 200 can be bent back along a selected weakened separation line in the release-coated liner 140, 140', 140", thereby forcing the edges 25 of the respective labels 136 to pop up off the release-coated liner and allow them to be grasped. The embodiments of lines 140', 140" in the release-coated liner that do not have ties 141 at each apex 133 are typically more conducive to being easily bent back than the embodiments of weakened separation lines 140 in the release-coated liner that are formed with ties therein.

Figure 22:
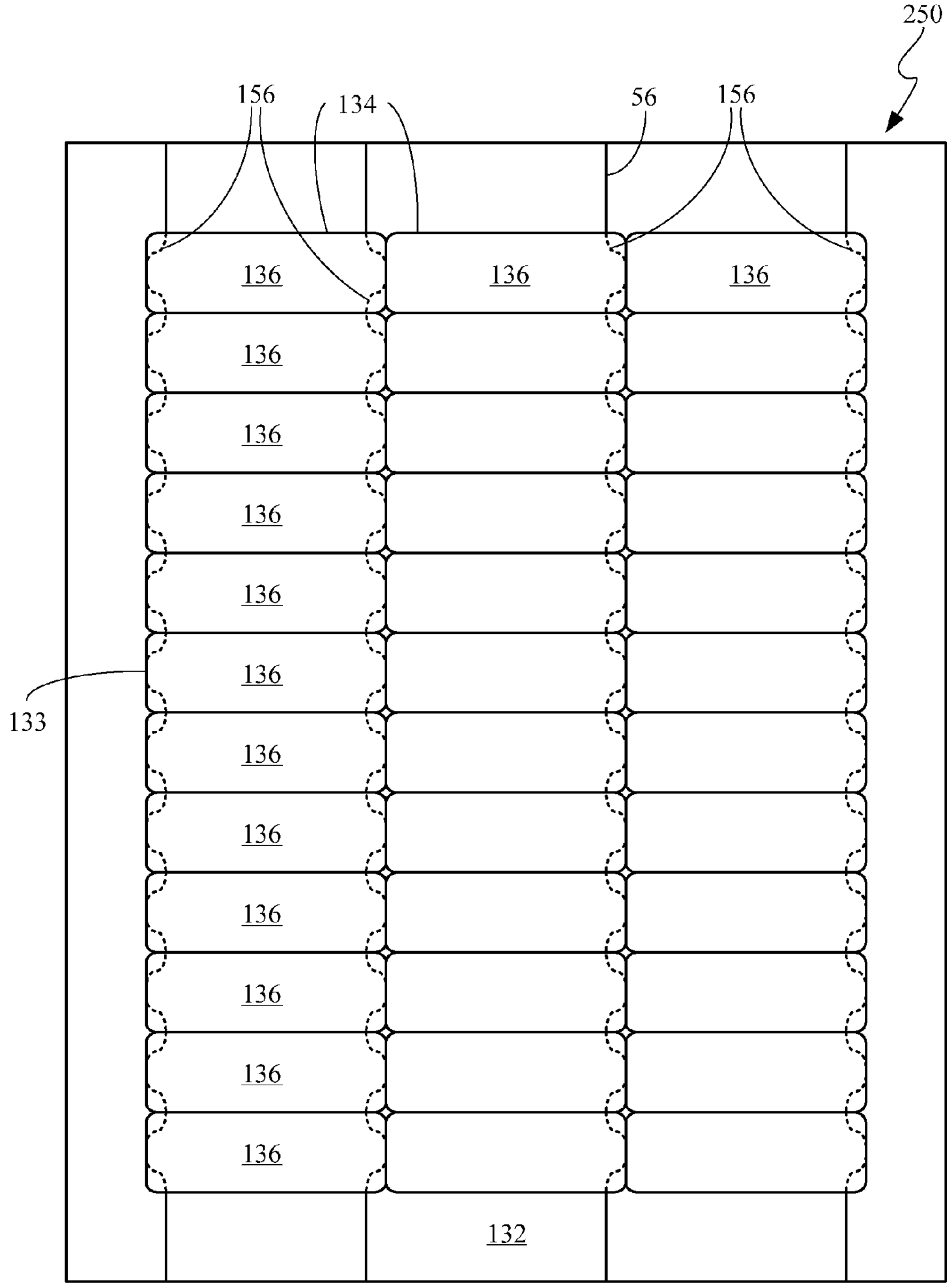
FIG. 22 is a plan view of the front of a label sheet of embodiment of the present invention.

With reference now to FIG. 22, in a further alternative, illustrative embodiment of a label sheet 250 that is similar to the embodiment of FIG. 20, weakened separation lines 156 in the release-coated liner can be formed with the same generally sinusoidal shape 145 discussed previously with respect to weakened separation lines 140 shown in FIG. 20, but are disposed underneath each column 135, 137, 139 of labels 136 such that an apex 133 of the weakened separation line in the release-coated liner does not reach beyond, but rather generally coincides with, the edge 25 of the respective label. This embodiment, as with the embodiment of FIG. 23 discussed below, will therefore not expose any portion of the release-coated liner 14 when the label sheet is separated into portions along the weakened separation lines in the release-coated liner, and will provide exposed corners 151, 152 of each label for ease of removal as described previously. Weakened separation lines in the release-coated liner can be formed with or without ties, as discussed elsewhere above.

Figure 23:
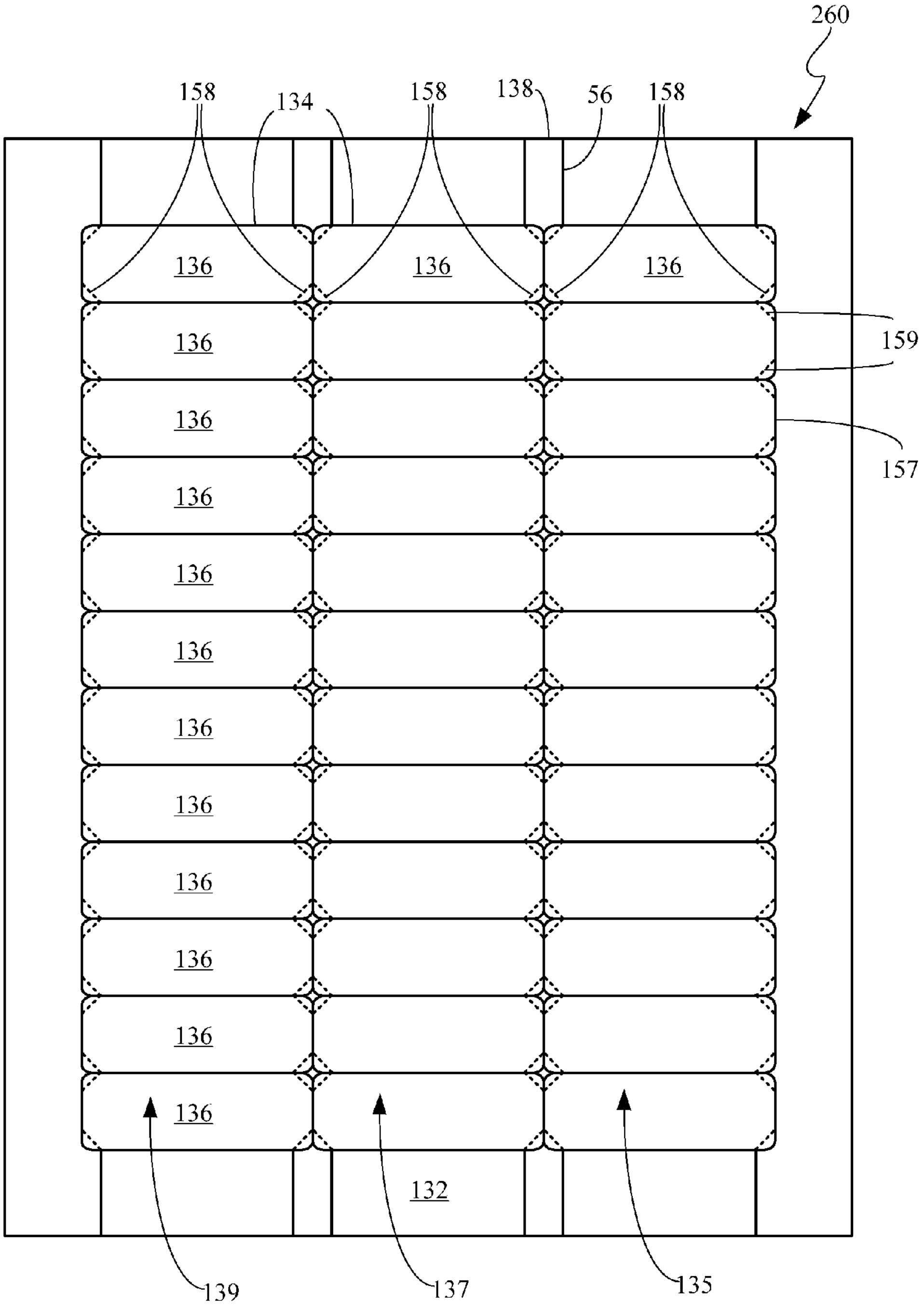
FIG. 23 is a plan view of the front of a label sheet of embodiment of the present invention.

In another illustrative alternative embodiment 260, shown in FIG. 23, weakened separation lines 158 are cut in the release-coated liner 14 to extend from the top edge 138 of the label sheet 260 along each edge 144 of each column 135, 137, 139 of labels 136. The lines are formed with a periodic shape composed of generally straight angular segments 159 that extend at an angle between the top and bottom edge of each label to the side edge of the respective label, to thereby define the corners 151, 152 that will be subsequently exposed upon separation of the label sheet into two portions 146, 148, and generally straight vertical segments 157 that extend along the edge 25 of each label between the corresponding angular segments to define a single, continuous weakened separation line 158 in the release-coated liner. Providing such a line in the release-coated liner along each edge of each column of labels provides a choice to the user as to which column of labels to use first, but it must be understood that a single weakened separation line in the release-coated liner can be provided for each column of labels, which can be formed underneath either of the left or right edge of each column of labels. As with the previous embodiments, a corresponding weakened separation line 56 in the facestock 132 is also provided over each portion of each liner weakened separation line 158 that extends from the edge of the label sheet to the nearest label. This embodiment will thus not expose any portion of the release-coated liner 14 when the label sheet is separated into portions along the weakened separation lines in the release-coated liner but will provide exposed corners of each label for ease of removal as described previously.

Figure 24:
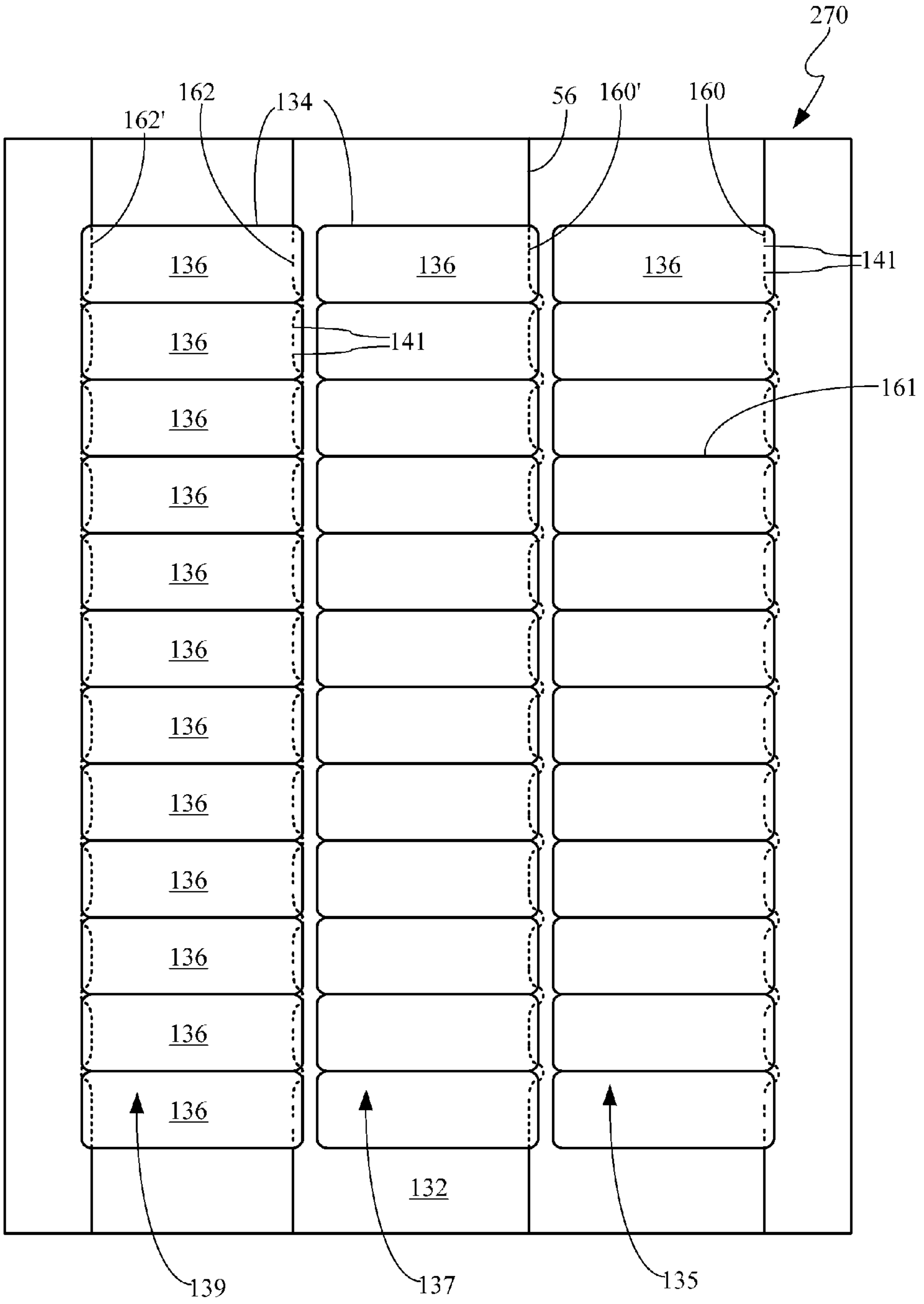
FIG. 24 is a plan view of the front of a label sheet of embodiment of the present invention.

In still another embodiment, as shown in FIG. 24, a label sheet 270 is formed with weakened separation lines 160, 160' in the release-coated liner 14 that extend generally along the edge 144 of each column 135, 137, 139 of labels 136 and beneath each label, but extend beyond the edge 25 of each label at the interface 161 between adjoining labels. In this embodiment, the weakened separation lines in the release-coated liner also extend beyond the edge of the respective column of labels as they extend past the edge of each label. The embodiment of the weakened separation line 160 in the release-coated liner is formed with ties 141 along the straight segments whereas the embodiment of the weakened separation line 160' does not include any ties.

In still another embodiment, also shown in FIG. 24, weakened separation line 162 in the release-coated liner 14 is similar to weakened separation lines 160, 160' but as the line 162 extends past the edge 25 of each label 136 at the interface between adjoining labels it does not extend beyond the edge of the respective column of labels. The weakened separation line 162 in the release-coated liner is formed with ties 141 in the straight segments thereof, similar to weakened separation line 160 in the release-coated liner. Another embodiment of a weakened separation line 162' in the release-coated liner extends along the left-most edge of the left-most column of labels in the label sheet and also does not extend beyond the edge of the respective column of labels as it extends past the edge of each label at the interface between adjoining labels, but does not include ties, similar to weakened separation line 160' in the release-coated liner. As described hereinabove, weakened separation line 162' in the release-coated liner is essentially a mirror image of weakened separation line 162 in the release-coated liner. In use of the embodiments of FIG. 24, the user can choose to tear the label sheet apart along a selected weakened separation line in the release-coated liner or bend it backwards, as previously discussed.

With reference now to FIGS. 25-33, in further embodiments, a cut 300, 320, 340, 360 in a release-coated liner 14 of a label sheet 10, 29, 80, 200, 250, 260, 270 is provided to tear the label sheet into two portions 146, 148, as previously disclosed. This cut can be formed by die cutting, scoring, or microperforations, as previously disclosed, or by any other practicable method.

Liner separation cuts known in the art are comprised of a single continuous cut line, along which separation occurs. Other liner separation cuts known in the art include a plurality of cut segments interspersed by ties that are all aligned on a single continuous line in an end-to-end fashion. In both of these cases, the separation path and the cuts are coincident, meaning the separation path and the cuts lie on the same line. The embodiments shown in FIGS. 25-33 have at least portions of cuts that do not lie on the separation path. In further embodiments, the cut segments are not linear segments but rather are complex shapes consisting of several linear segments joined together.

Figure 25:
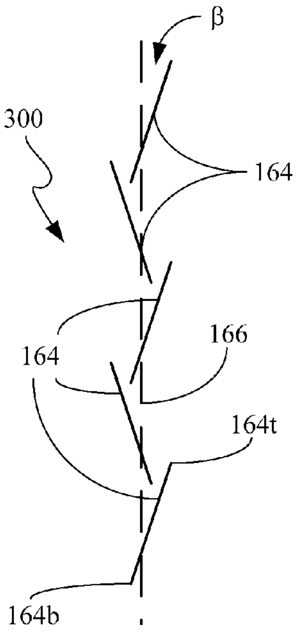
FIG. 25 is an expanded plan view of an embodiment of a series of release liner cuts of the present invention.
Figure 26:
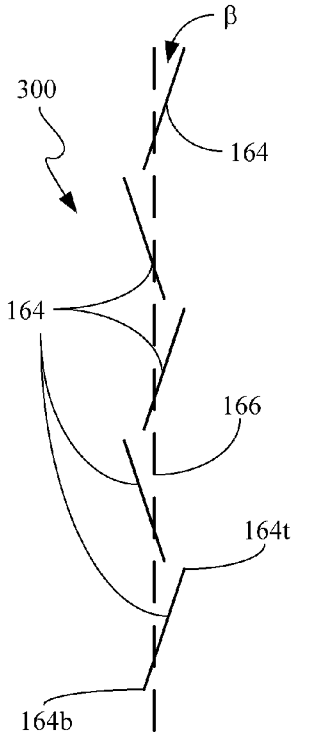
FIG. 26 is an expanded plan view of another embodiment of a series of release liner cuts.
Figure 27:
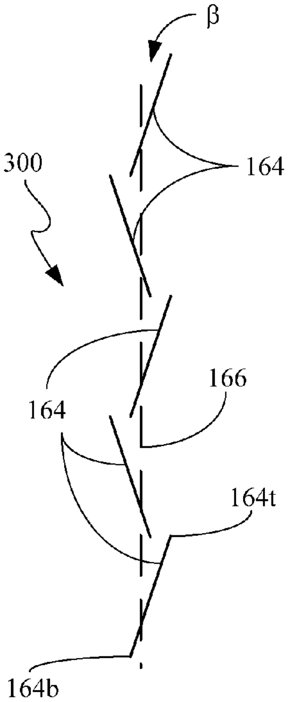
FIG. 27 is an expanded plan view of another embodiment of a series of release liner cuts.

One illustrative embodiment is shown in FIG. 25. A separation line 300 that can be cut in a release-coated liner 14 of a label sheet 10, 29, 80, 200, 250, 260, 270 as described elsewhere hereinabove is composed of a plurality of individual cut segments 164 that are disposed along, and at an acute angle β to, the separation path 166 (shown as a dashed line), along which the separation is selected to occur when the label sheet is torn as described hereinabove. Each individual cut segment has a top end 164*t* and a bottom end 164*b*, with the cut segments disposed relative to one another such that the top end of each segment is at the same point on the separation path as the bottom end of the immediately adjacent segment. In other embodiments, the segments can be disposed so that their respective adjacent ends are less far along the separation path, as shown in the embodiment of FIG. 26, or alternatively can be disposed so that their respective adjacent ends are farther along the separation path as shown in FIG. 27. To separate along the separation path using any of the embodiments of FIGS. 25-27, the label sheet is torn as previously described.

Figure 28:
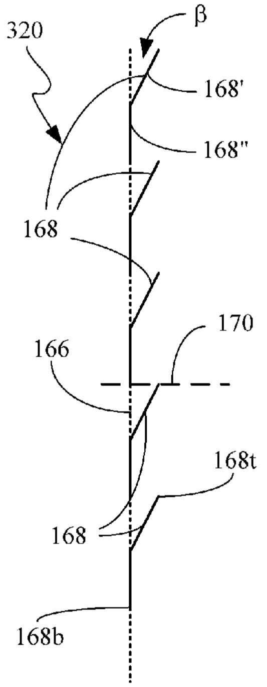
FIG. 28 is an expanded plan view of of another embodiment of a series of release liner cuts.
Figure 29:
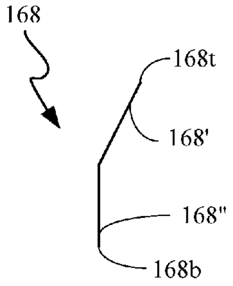
FIG. 29 is an expanded plan view of a release liner cut of FIG. 28.

With reference to FIGS. 28 and 29, in an alternative embodiment, a separation line 320 is composed of a plurality of cut shapes 168 disposed along a selected separation path 166, each shape is composed of two cut segments 168', 168" joined end-to-end. The shapes are disposed along the separation path with the same segment 168" aligned on the separation path, and the segment 168' is at an angle β to the separation path, such that each shape appears as half of a "Y" shape and includes a top end 168*t* and a bottom end 168*b*. The shapes can be disposed such that the bottom end of each shape and the top end of the immediately adjacent shape are aligned on an imaginary line 170 perpendicular to the separation path. In alternative embodiments, the bottom end of a shape and the top end of the immediately adjacent shape do not lie on the imaginary line.

Figure 30:
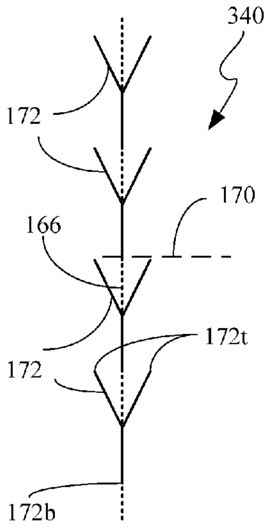
FIG. 30 is an expanded plan view of another embodiment of a series of release liner cuts.
Figure 31:
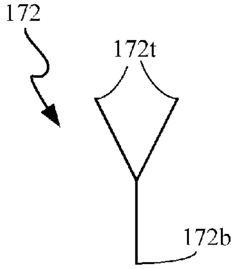
FIG. 31 is an expanded plan view of a release liner cut of FIG. 30.

The embodiment of FIGS. 30 and 31 is similar to the embodiment of FIG. 28 in that a separation line 340 is composed of a plurality of cut shapes 172 disposed along a selected separation path 166. The cut shapes of this embodiment have a generally "Y" shaped configuration, with the top of the fork of the "Y" defining a top end 172*t* of each shape and the bottom of the leg of the "Y" defining a bottom end 172*b* of the shape. The shapes are disposed along the separation path with the leg of each "Y" shape aligned on the separation path. The shapes can be disposed such that the top end of a shape and the bottom end of the immediately adjacent shape are aligned on an imaginary line 170 perpendicular to the separation path. In alternative embodiments, the bottom end of a shape and the top end of the immediately adjacent shape do not end on the imaginary line.

Figure 32:
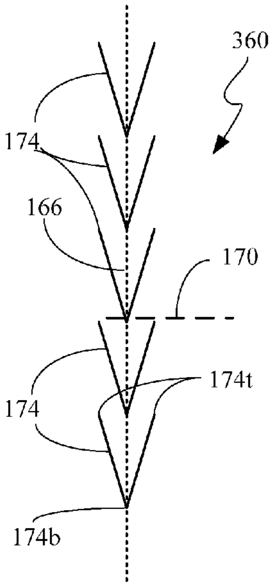
FIG. 32 is an expanded plan view of another embodiment of a series of release liner cuts.
Figure 33:
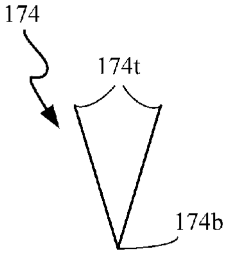
FIG. 33 is an expanded plan view of a release liner cut of FIG. 32.

The embodiment of FIGS. 32 and 33 is similar to the embodiments of FIGS. 28 and 30 in that a separation line 360 is composed of a plurality of cut shapes 174 disposed along a selected separation path 166. The cut shapes of this embodiment have a generally "V" shaped configuration, with the top of the fork of the "V" defining a top end 174*t* of each shape and the tip of the "V" defining a bottom end 174*b* of the shape. The shapes are disposed along the separation path with the tip of each "V" shape disposed on the separation path and the arms of the "V" extending at equal angles to the separation path. The shapes can be disposed such that the top end of a shape and the bottom end of the immediately adjacent shape are aligned on an imaginary line 170 perpendicular to the separation path. In alternative embodiments, the bottom end of a shape and the top end of the immediately adjacent shape do not end on the imaginary line.

Figure 34:
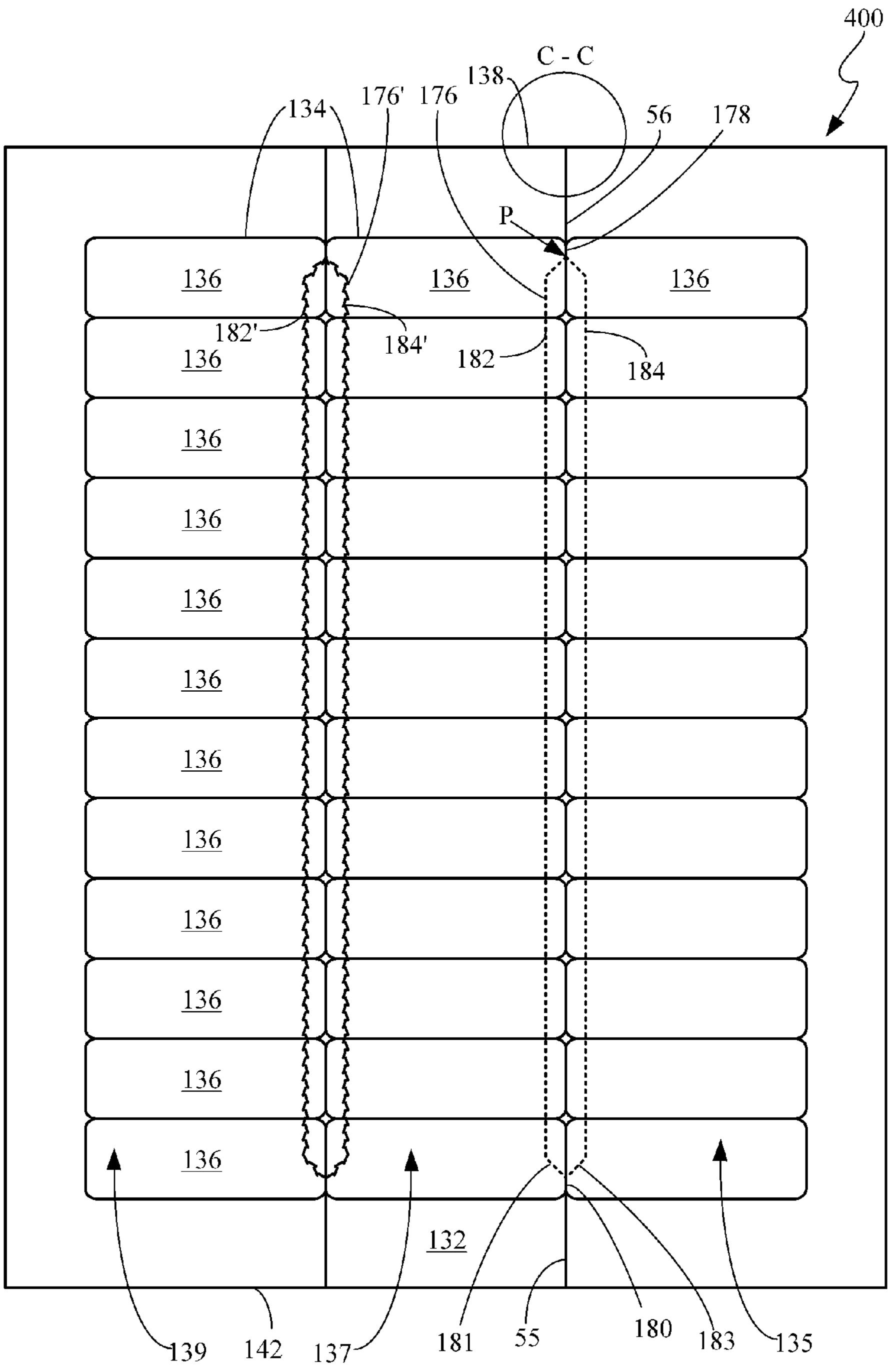
FIG. 34 is a plan view of the front of a label sheet of another embodiment of the present invention.

In another embodiment and as illustrated in FIG. 34, a label sheet 400 can be formed with a plurality of labels 136 as described elsewhere herein. In the present embodiment, the label sheet is further formed with weakened separation lines 176 cut in the release-coated liner 14 to aid in tearing the label sheet into two portions and thereby expose the edges 25 of a column 135, 137, 139 of labels for easy removal thereof. In this particular embodiment, liner weakened separation lines are composed of cut segments 178 and 180, underlying weakened facestock lines 56 and 55, respectively, and extending from each of the top 138 and bottom 142 edge, respectively, of the label sheet to a point P between two adjacent labels in two adjacent columns of labels. The separation lines also include substantially parallel weakened separation lines 182, 184. Weakened separation line 182 extends between the two cut segments and underneath one of the columns of labels, and weakened separation line 184 extending between the two cut segments and underneath the other column of labels. Angled cut segments 181, 183 connect the weakened separation lines 182, 184 with the cut segments 178, 180. It must be understood that the weakened separation lines 182, 184 can be formed in any of the embodiments disclosed herein or known in the art. Thus, weakened separation lines 176, 182, 184 are shown to be essentially straight, linear cuts, whereas weakened separation lines 182', 184' of weakened separation line 176' are essentially separation paths along which a plurality of cut segments formed in accordance with the embodiment of FIG. 27 are disposed. The weakened separation lines 182, 184 can also be formed in a generally sinusoidal pattern 145 as also disclosed above, and can be formed with or without ties therein. As discussed hereinabove, a corresponding weakened separation line 55, 56 in the facestock is also provided over each portion of each cut segment.

An advantage conferred by the embodiments of FIG. 34 is that the label sheet can be torn apart to expose either of the two columns of labels straddled by each separation line 176 or 176' simply by choosing which of the two portions 146, 148 to pull and push away. For instance, looking at the label sheet 400 from the facestock 132 side and grasping the label sheet with the user's right hand on the right side of separation line 178, and the user's left hand on the left side of the separation line, the label sheet can be separated to expose the left edges of the rightmost column 135 of labels 136 by holding the left hand still and moving the right hand toward the user's body. Alternatively, holding the user's right hand still and moving the left hand toward the user's body exposes the right edges of the center column 137 of labels.

Figure 35:
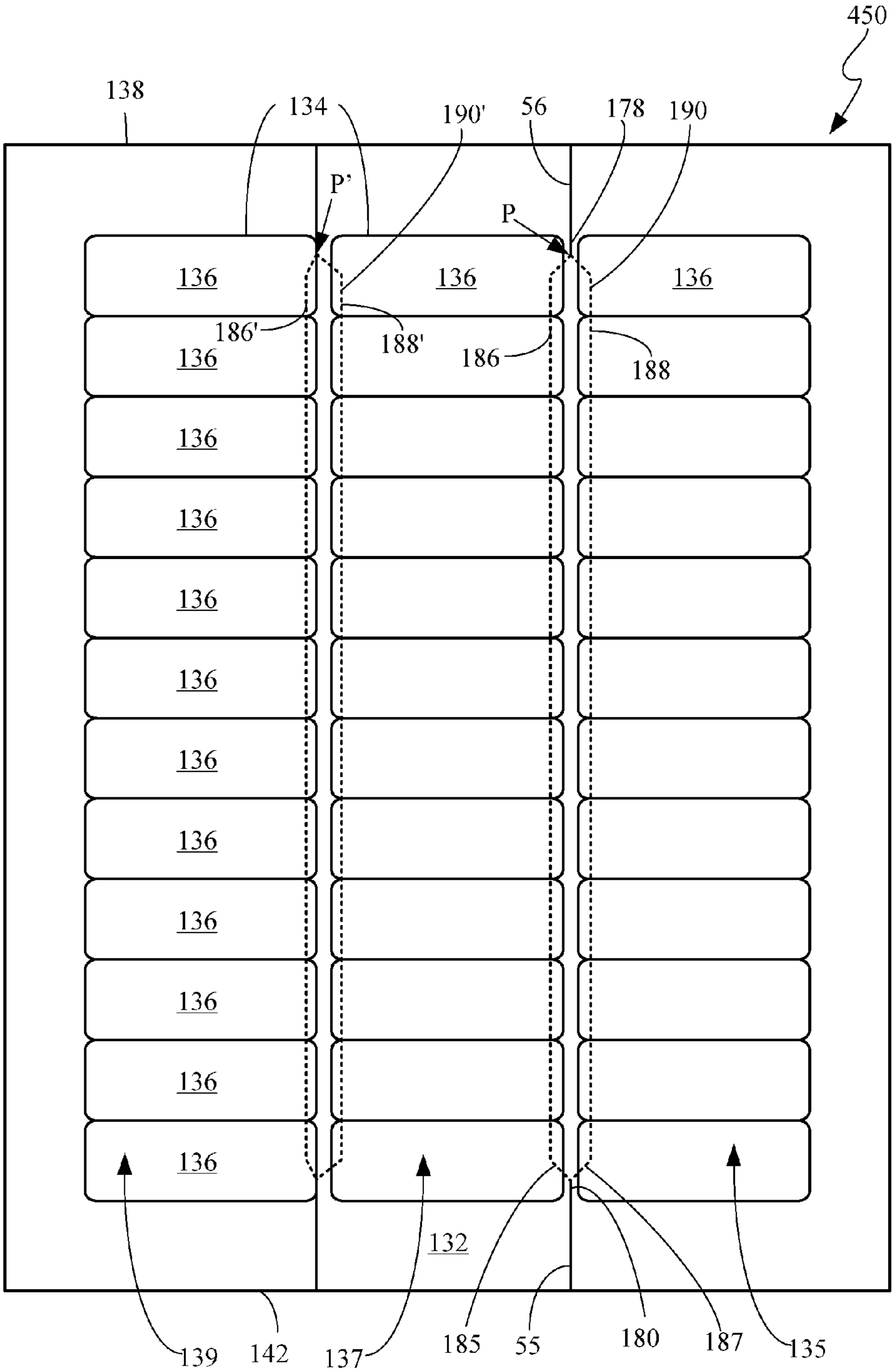
FIG. 35 is a plan view of the front of a label sheet of another embodiment of the present invention.

In a variation on the above embodiment shown in FIG. 35, the columns 135, 137, 139 of labels 136 on the label sheet 450 are separated as previously shown and discussed in the embodiment of FIG. 24. As previously discussed, the area between the columns of labels can have facestock 12 disposed over the release-coated liner 14. In alternative embodiments, the area between the columns of labels can be devoid of facestock disposed over the release-coated liner. As shown in FIG. 35, in one embodiment, weakened separation line 190 includes weakened separation line segments 178, 180, which extend from each of the top 138 and bottom 142 edges of the label sheet to a point P, between adjacent labels in two adjacent columns of labels, and two substantially parallel weakened separation lines 186, 188, each extending between the two cut segments. Weakened separation line 186 extends between the two cut segments and underneath one of the columns of labels, and weakened separation line 188 extends between the two cut segments and underneath the other column of labels. Angled cut segments 185, 187 connect the weakened separation lines 186, 188 with the cut segments 178, 180. In this embodiment the point P is also disposed between the two columns of labels. In an alternative embodiment, separation line 190' is formed similarly to separation line 190 but the point P' where the two substantially parallel weakened separation lines 186', 188' intersect the cut segments 178, 180 is disposed underneath the edge of the topmost and bottommost labels. To require the same amount of effort to separate the label sheet in either direction, it is desirable that the two substantially parallel weakened separation lines are spaced an equal amount from the edge of the respective column of labels, as shown in the figure.

Figure 36:
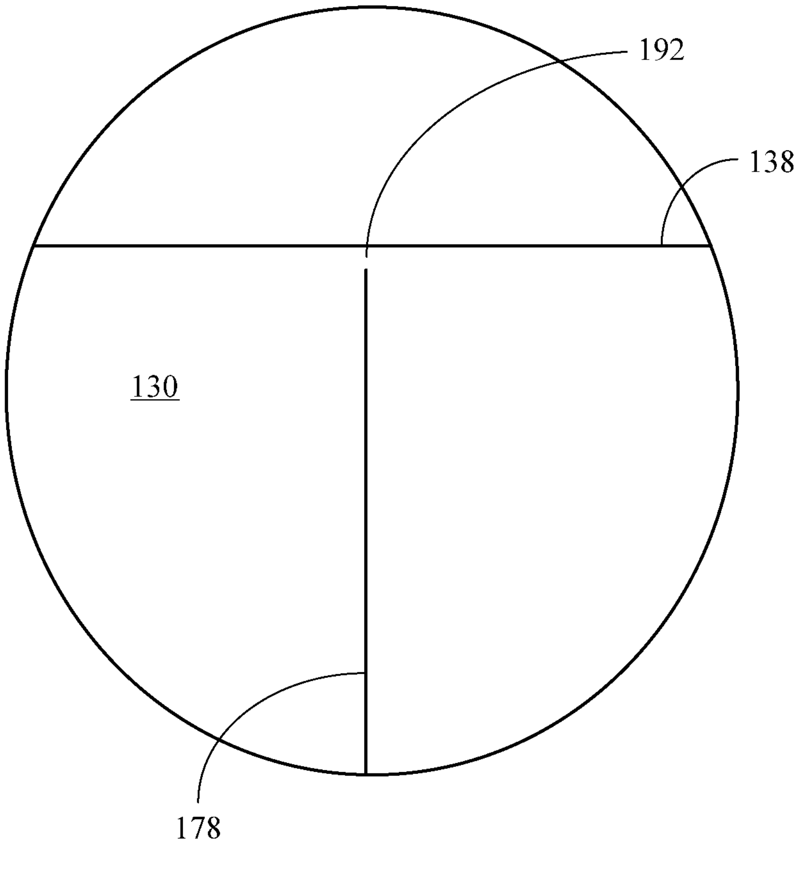
FIG. 36 is an expanded plan view of an embodiment at region C-C of FIG. 34.

In an alternative embodiment, the weakened separation line in the release-coated liner 14, etc. of any of the embodiments disclosed herein does not reach the edge of the release-coated liner 130 but rather ends in a tie 192 adjacent to the edge, as shown in FIG. 36, which depicts the detail of an embodiment label sheet 400 at region C-C shown in FIG. 34 from the back side (i.e. looking at the release-coated liner, not the facestock 132). The provision of a small tie between the edge of the sheet 138 and the liner cut 178 can help prevent premature tearing of the label sheet, for example, while feeding the label sheet through a printer.

Figure 37:
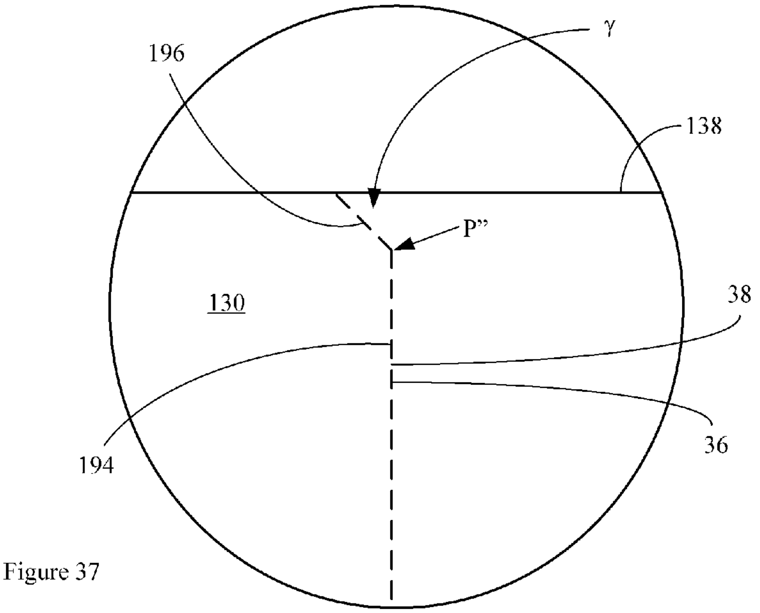
FIG. 37 is an expanded plan view of an embodiment at region C-C of FIG. 34.

In a still further embodiment of a liner cut 194 as shown in FIG. 37, which also depicts a label sheet 400 at region C-C shown in FIG. 34 from the back side (release-coated liner 130 side), the liner cut intersects the edge 138 of the release-coated liner at an angle $\gamma$ other than 90° to help minimize inadvertent tearing of the label sheet during handling. Thus, as shown, the liner cut is formed with an angled segment 196 at its end where it intersects the edge of the release-coated liner. The angled segment intersects the liner cut at a point of inflexion P". Such an embodiment can be advantageous with an embodiment of a label sheet where the labels 136 extend to the edge of the label sheet and there is no matrix of release-coated liner or release-coated liner and facestock surrounding the columns of labels. The angled portion of the liner cut that intersects the label sheet edge will allow easy separation and also help minimize or prevent inadvertent tearing due to handling. In embodiments where the liner cut is formed of a plurality of cut segments 36 interspersed with ties 38 (as shown in FIG. 37) rather than a single continuous line and the labels extend to the edge of the sheet, it is desirable that a cut segment extend to the edge of the release-coated liner/label sheet rather than a tie. Similarly, in such an embodiment, it is preferable that the point of inflexion P" of the liner cut also be defined by an uninterrupted cut segment (as also shown in FIG. 37) with no ties therebetween to help the change in direction of the tearing force applied during separation of the label sheet.

Figure 38:
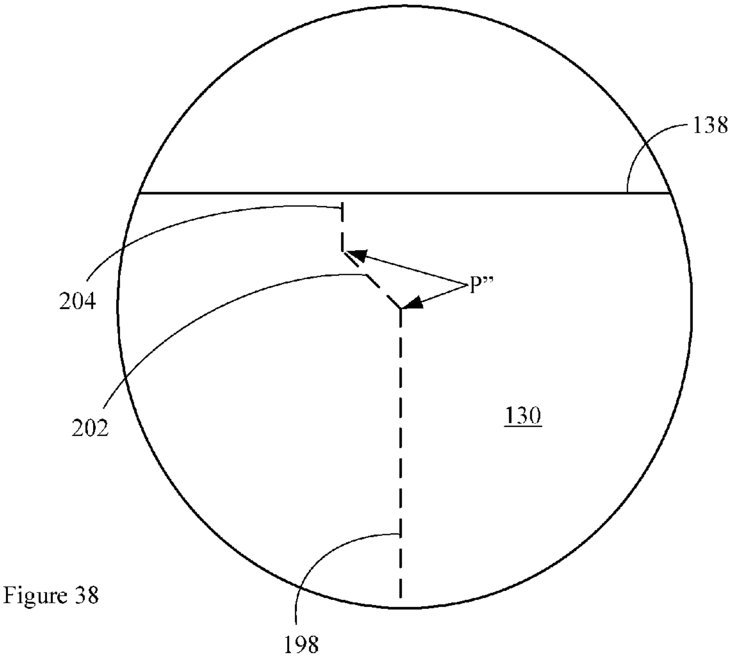
FIG. 38 is an expanded plan view of an embodiment at region C-C of FIG. 34.

In a variation as shown in FIG. 38, a liner cut 198 is formed with a segment 204 at the end that intersects the edge 138 of the release-coated liner 130 perpendicularly, but which is offset from, and connected to, the liner cut by an angled segment 202. In embodiments where the liner cut is formed of a plurality of cut segments interspersed with ties (as shown in FIG. 38) rather than a single continuous line and the labels extend to the edge of the sheet, it is desirable that a cut segment extend to the edge of the release-coated liner/label sheet rather than a tie. Similarly, in such an embodiment, it is preferable that the points of inflexion P" where the liner cut changes direction be defined by an uninterrupted cut segment (as also shown in FIG. 38) with no ties therebetween to help the change in direction of the tearing force applied during separation of the label sheet.

Figure 39:
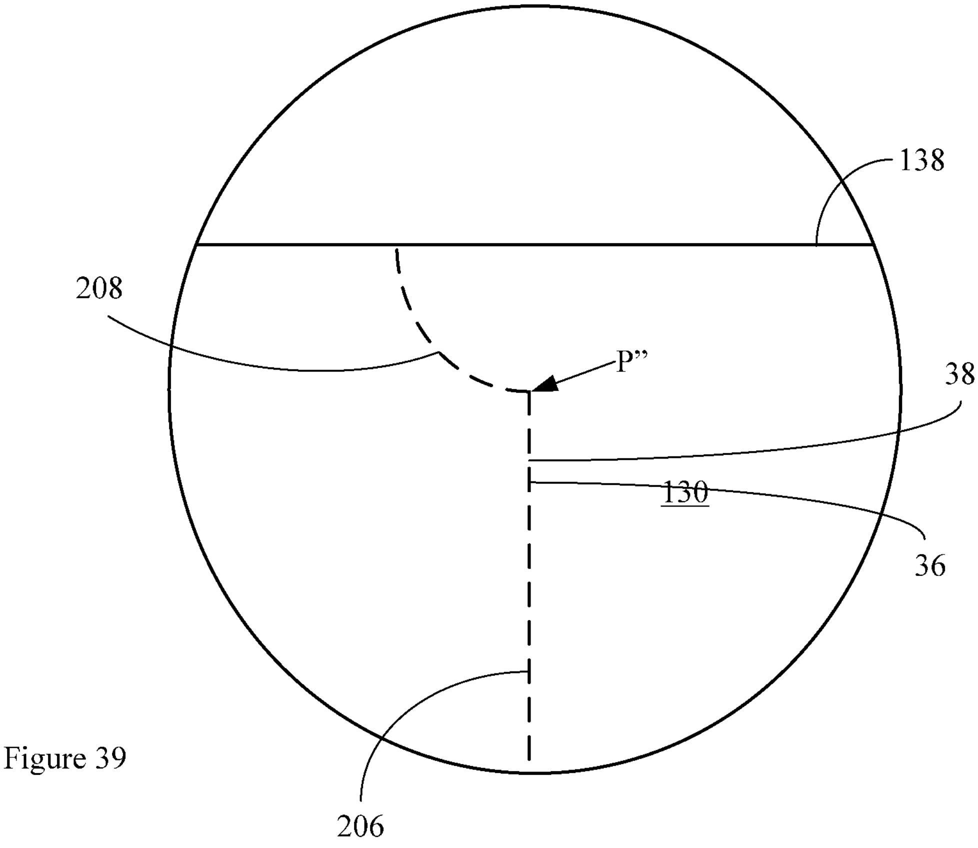
FIG. 39 is an expanded plan view of an embodiment at region C-C of FIG. 34.

In another variation as shown in FIG. 39, a liner cut 206 is formed with a curvilinear segment 208 at the end that intersects the edge 138 of the release-coated liner 130 at 90° , and which connects to the liner cut at an inflexion point P". In embodiments where the liner cut is formed of a plurality of cut segments 36 interspersed with ties 38 (as shown in FIG. 39) rather than a single continuous line and the labels extend to the edge of the sheet, it is desirable that a cut segment extend to the edge of the release-coated liner/label sheet rather than a tie. Similarly, in such an embodiment, it is preferable that the points of inflexion P" where the liner cut changes direction be defined by an uninterrupted cut segment (as also shown in FIG. 38) with no ties therebetween to help the change in direction of the tearing force applied during separation of the label sheet. It must be understood that the embodiments of FIGS. 37-39 can also be formed with liner cuts that are continuous die cuts, scores, or microperforations. Inflection points P" are shown as angle, however, the angled segment or curvilinear segment can intersect the liner cut in a curved manner to further direct the change in direction of the tearing force.

It is to be understood that the foregoing description of embodiments has been presented for illustrative purposes and is not intended to limit the invention to the presented embodiments. Other embodiments can be made without departing from the scope of the present invention. Accordingly, many modifications and variations are possible in light of the above teachings. For example, the curved segments formed in the release-coated liner can be other shapes such as triangular or semi-circular. It is therefore intended that the scope of the invention not be limited by specific examples in the detailed description.

What is claimed is:

1. A label sheet comprising:

(a) a facestock having at least one column of labels; and (b) a liner releasably coupled to the facestock;

(c) wherein:

(i) the liner includes a weakened separation line, (ii) the weakened separation line includes a major portion having linear portions and a plurality of apices, (iii) the weakened separation line at least partially underlies the column of labels with at least one of the plurality of apices directly underlying one of the labels, (iv) the weakened separation line is free of ties at at least one of the plurality of apices, (v) the column of labels have a back surface to which adhesive is applied, and (vi) the liner is configured to be folded along the weakened separation line exposing the adhesive on only a portion of the back surface of the column of labels.

2. The label sheet of claim 1, wherein:

(a) each of the labels includes a label edge; and (b) at least one of the plurality of apices is adjacent to the label edge.

3. The label sheet of 2, wherein the linear portions of the weakened separation line are aligned with and parallel to each label edge.

4. The label sheet of claim 1, wherein:

(a) the column of labels are adhesive-backed labels; and (b) the adhesive is a pressure sensitive adhesive.

5. The label sheet of claim 1, wherein the liner is a release-coated liner.

6. The label sheet of claim 1, wherein:

(a) the label sheet has a first edge and a second edge; and (b) the weakened separation line extends between the first edge and the second edge.

7. The label sheet of claim 1, wherein the weakened separation line is truncated at at least one of the plurality of apices.

8. The label sheet of claim 1, wherein the weakened separation line includes cuts and ties.

9. The label sheet of claim 8, wherein:

(a) each of the ties has a length; and (b) the length of the ties ranges from approximately 0.013 inch (0.33 mm) to approximately 0.050 inch (1.27 mm).

10. The label sheet of claim 8, wherein:

(a) each of the ties has a length; and (b) the length of the ties is approximately 0.03 inch (0.76 mm).

11. The label sheet of claim 1, wherein at least one of the plurality of apices has a shape selected from the group consisting of rounded, square, rectangular, trapezoidal, elliptical, and triangular.

12. The label sheet of claim 1, wherein:

(a) each apex of the plurality of apices are included within curved portions of the weakened separation line; and (b) the weakened separation line is free of ties at least one of the curved portions.

13. A label sheet comprising:

(a) a facestock having at least one column of labels, wherein the facestock includes a back surface to which adhesive is applied; and (b) a liner releasably coupled to the facestock;

(c) wherein:

(i) the liner includes a weakened separation line, (ii) the weakened separation line includes a major portion having linear portions and a plurality of apices, (iii) the weakened separation line at least partially underlies the column of labels with at least one of the plurality of apices extends beyond a linear edge of the column of labels, (iv) the weakened separation line is free of ties at at least one of the plurality of apices; and (v) the liner is configured to be folded along the weakened separation line exposing the adhesive on only a portion of the back surface of the column of labels.

14. The label sheet of claim 13, wherein the adhesive is a pressure sensitive adhesive.

15. The label sheet of claim 13, wherein the liner is a release-coated liner.

16. The label sheet of claim 13, wherein:

(a) the label sheet has a first edge and a second edge; and (b) the weakened separation line extends between the first edge and the second edge.

17. The label sheet of claim 13, wherein the weakened separation line includes cuts and ties.

18. The label sheet of claim 13, wherein:

(a) each of the labels of the at least one column of labels includes a label edge; and (b) the linear portions of the weakened separation line are aligned with and parallel to each label edge.

19. A label sheet comprising:

(a) a facestock having at least one column of labels, wherein the facestock includes a back surface to which adhesive is applied; and (b) a liner releasably coupled to the facestock;

(c) wherein:

(i) the label sheet has a first edge and a second edge, (ii) the liner includes a weakened separation line that extends between the first edge and the second edge, (iii) the weakened separation line includes a major portion having linear portions and a plurality of apices, (iv) the weakened separation line at least partially underlies the column of labels with at least one of the plurality of apices is adjacent to and extends to a linear edge of the column of labels, (v) the weakened separation line includes cuts and ties;

(vi) the weakened separation line is free of ties at at least one of the plurality of apices; and (vii) the liner is configured to be folded along the weakened separation line exposing the adhesive on only a portion of the back surface of the column of labels.

20. The label sheet of claim 19, wherein:

(a) each of the labels of the at least one column of labels includes a label edge; and (b) the linear portions of the weakened separation line are aligned with a parallel to each label edge.

* * * * *